(12) United States Patent
Xiong et al.

(10) Patent No.: US 11,368,634 B2
(45) Date of Patent: Jun. 21, 2022

(54) AUDIO STREAM AND VIDEO STREAM SYNCHRONOUS SWITCHING METHOD AND APPARATUS

(71) Applicant: Huawei Technologies Co., Ltd., Shenzhen (CN)

(72) Inventors: Jie Xiong, Nanjing (CN); Jinhui Zhang, Shenzhen (CN); Chao Liu, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 17/402,110

(22) Filed: Aug. 13, 2021

(65) Prior Publication Data

US 2021/0377458 A1 Dec. 2, 2021

Related U.S. Application Data

(63) Continuation of application No. PCT/CN2019/123843, filed on Dec. 7, 2019.

(30) Foreign Application Priority Data

Feb. 28, 2019 (CN) .......................... 201910151206.7

(51) Int. Cl.
*H04N 7/173* (2011.01)
*H04N 5/268* (2006.01)
(Continued)

(52) U.S. Cl.
CPC ............. *H04N 5/268* (2013.01); *G10L 25/57* (2013.01); *H04N 21/242* (2013.01); *H04N 21/4307* (2013.01); *H04N 21/8547* (2013.01)

(58) Field of Classification Search
CPC ............... H04N 21/268; H04N 21/242; H04N 21/4307; H04N 21/8547; G10L 25/57
See application file for complete search history.

(56) References Cited

U.S. PATENT DOCUMENTS 9,264,472 B2 * 2/2016 Costanzo ........... H04N 21/4314
10,158,927 B1 * 12/2018 Lei ........................ H04N 21/233
(Continued)

FOREIGN PATENT DOCUMENTS

| CN | 101282482 A | 10/2008 |
|---|---|---|
| CN | 101536497 A | 9/2009 |

(Continued)

OTHER PUBLICATIONS

H. Schulzrinne et al., "RTP: A Transport Protocol for Real-Time Applications," Request for Comments: 3550, Network Working Group, Jul. 2003, 89 pages.
(Continued)

*Primary Examiner* — Mulugeta Mengesha
(74) *Attorney, Agent, or Firm* — Conley Rose, P.C.

(57) ABSTRACT

A switching device determines a video parameter value of a switching point of a first video stream, and determines a video parameter value of a switching point of a second video stream. The video parameter value includes a timestamp and/or a sequence number. The switching device determines an audio parameter value of a switching point of a first audio stream based on a timestamp of the switching point of the first video stream, and determines an audio parameter value of a switching point of a second audio stream based on a timestamp of the switching point of the second video stream. The audio parameter value includes a timestamp and/or a sequence number. The switching device performs switching based on determined switching points.

22 Claims, 9 Drawing Sheets

(51) Int. Cl.
*G10L 25/57* (2013.01)
*H04N 21/242* (2011.01)
*H04N 21/43* (2011.01)
*H04N 21/8547* (2011.01)

(56) References Cited

U.S. PATENT DOCUMENTS

| | | | |
|---|---|---|---|
| 2004/0218093 | A1 | 11/2004 | Radha et al. |
| 2010/0014594 | A1 | 1/2010 | Beheydt et al. |
| 2010/0064316 | A1 | 3/2010 | Dai et al. |
| 2012/0098923 | A1 | 4/2012 | Westin |
| 2014/0375889 | A1 | 12/2014 | Cho et al. |
| 2015/0195427 | A1 | 7/2015 | Yeh et al. |
| 2016/0029075 | A1 | 1/2016 | Erickson |
| 2017/0126767 | A1 | 3/2017 | Cai |
| 2018/0191794 | A1* | 7/2018 | Chen .................. H04L 65/605 |
| 2018/0241969 | A1 | 8/2018 | Karlsson et al. |
| 2018/0295411 | A1 | 10/2018 | Xu |
| 2018/0367839 | A1 | 12/2018 | Vandoros |
| 2020/0280749 | A1* | 9/2020 | Nakamura ......... H04N 21/6437 |
| 2020/0287644 | A1* | 9/2020 | Almog ............ H04N 21/64322 |

FOREIGN PATENT DOCUMENTS

| | | |
|---|---|---|
| CN | 101662689 A | 3/2010 |
| CN | 105376613 A | 3/2016 |
| CN | 105657524 A | 6/2016 |
| CN | 105657579 A | 6/2016 |
| CN | 106488255 A | 3/2017 |
| CN | 107277594 A | 10/2017 |
| CN | 109348247 A | 2/2019 |

OTHER PUBLICATIONS

IEEE Std 1588TM-2008(Revision of IEEE Std 1588-2002), IEEE Standard for a Precision Clock Synchronization Protocol for Networked Measurement and Control Systems, Sponsor Technical Committee on Sensor Technology (ITC-9) of the IEEE Instrumentation and Measurement Society, Jul. 24, 2008, total 289 pages.

SMPTE ST 2110-10:2017, SMPTE Standard Professional Media Over Managed IP Networks: System Timing and Definitions, Copyright 2017 by The Society of Motion Picture and Television Engineers 445 Hamilton Avenue., White Plains, NY 10601, Approved Sep. 18, 2017, total 17 pages.

SMPTE ST 2110-20:2017, SMPTE Standard Professional Media Over Managed IP Networks: Uncompressed Active Video, Copyright 2017 by The Society of Motion Picture and Television Engineers 445 Hamilton Avenue., White Plains, NY 10601, Approved Sep. 18, 2017, total 22 pages.

SMPTE ST 2110-21:2017, SMPTE Standard Professional Media Over Managed IP Networks:Traffic Shaping and Delivery Timing for Video, Copyright 2017 by The Society of Motion Picture and Television Engineers 445 Hamilton Avenue., White Plains, NY 10601, Approved Nov. 22, 2017, total 17 pages.

SMPTE ST 2110-30:2017, SMPTE Standard Professional Media Over Managed IP Networks: PCM Digital Audio, Copyright 2017 by The Society of Motion Picture and Television Engineers 445 Hamilton Avenue., White Plains, NY 10601, Approved Sep. 18, 2017, total 9 pages.

SMPTE ST 2110-40:2018, SMPTE Standard Professional Media Over Managed IP Networks: SMPTE ST 291-1 Ancillary Data, Copyright 2018 by The Society of Motion Picture and Television Engineers 445 Hamilton Avenue., White Plains, NY 10601, Approved Apr. 12, 2018, total 8 pages.

SMPTE ST 32059-1:2015, SMPTE Standard Generation and Alignment of Interface Signals to the SMPTE Epoch, Copyright 2015 by The Society of Motion Picture and Television Engineers 3 Barker Avenue, White Plains, NY 10601, Approved Mar. 26, 2015, total 31 pages.

SMPTE ST 2059-2:2015, SMPTE Standard SMPTE Profile for Use of IEEE-1588 Precision Time Protocol in Professional Broadcast Applications, Copyright 2015 by The Society of Motion Picture and Television Engineers, 3 Barker Avenue, White Plains, NY 10601, Approved Mar. 26, 2015, total 19 pages.

\* cited by examiner

AUDIO STREAM AND VIDEO STREAM SYNCHRONOUS SWITCHING METHOD AND APPARATUS

CROSS-REFERENCE TO RELATED APPLICATIONS

This application is a continuation of International Patent Application No. PCT/CN2019/123843, filed on Dec. 7, 2019, which claims priority to Chinese Patent Application No. 201910151206.7, filed on Feb. 28, 2019, both of which are hereby incorporated by reference in their entireties.

TECHNICAL FIELD

This application relates to the field of multimedia communications technologies, and in particular, to an audio stream and video stream synchronous switching method and apparatus.

BACKGROUND

In the field of multimedia communications technologies, for example, the television (TV) production and broadcasting field, an audio stream and a video stream are transmitted separately. Audio stream switching and video stream switching are independently completed. Therefore, synchronization between audio streams and video streams after switching cannot be ensured.

SUMMARY

Embodiments of this application provide an audio stream and video stream synchronous switching method and apparatus, to resolve an existing problem that synchronization between audio streams and video streams after switching cannot be ensured.

According to a first aspect, an embodiment of this application provides an audio stream and video stream synchronous switching method, including the following steps.

A switching device receives a switching instruction. The switching instruction is used to instruct to switch from a transmitted first audio stream to a second audio stream and switch from a transmitted first video stream to a second video stream. The switching device determines a video parameter value of a switching point of the first video stream and a video parameter value of a switching point of the second video stream. The video parameter value includes a timestamp and/or a sequence number. The switching device determines an audio parameter value of a switching point of the first audio stream based on a timestamp of the switching point of the first video stream, and determines an audio parameter value of a switching point of the second audio stream based on a timestamp of the switching point of the second video stream. The audio parameter value includes a timestamp and/or a sequence number. The switching device switches packets that are in the first video stream and whose video parameter values are greater than the video parameter value of the switching point of the first video stream to packets that are in the second video stream and whose video parameter values are greater than the video parameter value of the switching point of the second video stream, and switches packets that are in the first audio stream and whose audio parameter values are greater than the audio parameter value of the switching point of the first audio stream to packets that are in the second audio stream and whose audio parameter values are greater than the audio parameter value of the switching point of the second audio stream.

The solution used in this embodiment of this application is different from an existing solution in which video stream switching and audio stream switching are independently performed. In this solution, after switching points of video streams are determined, switching points of audio streams are determined based on the switching points of the video streams. The switching points of the audio streams are as close as possible to the switching points of the video streams in a time dimension, to ensure synchronization between the audio streams and the video streams.

For example, Packets included in the audio streams may be Real-time Transport Protocol (RTP) packets. Packets included in the video streams may be RTP packets.

In a possible design, that the switching device determines a video parameter value of a switching point of the first video stream and a video parameter value of a switching point of the second video stream includes the following.

The switching device determines a synchronization relationship between the first video stream and the second video stream based on a timestamp of a first packet in the first video stream and a timestamp of a second packet in the second video stream, where a time period of receiving a first video frame to which the first packet belongs overlaps a time period of receiving a second video frame to which the second packet belongs; and the switching device determines the video parameter value of the switching point of the first video stream based on the synchronization relationship and a video parameter value of the first packet, and determines the video parameter value of the switching point of the second video stream based on the synchronization relationship and a video parameter value of the second packet.

In the existing solution, switching points of video streams need to be determined by scanning the video streams packet by packet. However, in the design of this application, switching points of two to-be-switched video streams are determined based on video parameter values of packets that are in two video frames and whose receiving time periods overlap. This is simple and effective.

In a possible design, when the video parameter value includes the timestamp, that the switching device determines the video parameter value of the switching point of the first video stream based on the synchronization relationship and a video parameter value of the first packet, and determines the video parameter value of the switching point of the second video stream based on the synchronization relationship and a video parameter value of the second packet includes.

The switching device determines the timestamp of the switching point of the first video stream based on the synchronization relationship, the timestamp of the first packet, and a video frame duration of the first video stream, and determines the timestamp of the switching point of the second video stream based on the synchronization relationship, the timestamp of the second packet, and a video frame duration of the second video stream.

When the timestamp is used for the video stream switching, the design provides a simple and effective manner for determining timestamps of the switching points of the video streams. This has comparatively low complexity.

In a possible design, the timestamp of the switching point of the first video stream and the timestamp of the switching point of the second video stream meet the following conditions, if the first video stream and the second video stream are synchronized, $TS\_sw\_v1 = FT\_TS1 + N*T1$, and $TS\_sw\_v2 = FT\_TS2 + N*T2$; if the first video stream is later than the second video stream, TS_sw_v1=FT_TS1+(N+1)*T1, and TS_sw_v2=FT_TS2+N*T2; or if the first video stream is earlier than the second video stream, TS_sw_v1=FT_TS1+N*T1, and TS_sw_v2=FT_TS2+(N+1)*T2, where T1 represents the video frame duration of the first video stream, T2 represents the video frame duration of the second video stream, TS_sw_v1 represents the timestamp of the switching point of the first video stream, TS_sw_v2 represents the timestamp of the switching point of the second video stream, and N is an integer greater than 0.

The design provides a method for determining the timestamps of the switching points of the video streams. This is simple and easy to implement and has low complexity.

In a possible design, when the audio parameter value includes the timestamp, that the switching device determines an audio parameter value of a switching point of the first audio stream based on a timestamp of the switching point of the first video stream, and determines an audio parameter value of a switching point of the second audio stream based on a timestamp of the switching point of the second video stream includes the following.

The switching device determines a timestamp of the switching point of the first audio stream based on the timestamp of the switching point of the first video stream, the video frame duration of the first video stream, a clock frequency of the first video stream, and a sampling rate of the first audio stream, and the switching device determines a timestamp of the switching point of the first audio stream based on the timestamp of the switching point of the second video stream, the video frame duration of the second video stream, a clock frequency of the second video stream, and a sampling rate of the first audio stream.

The design provides a specific manner for determining timestamps of the switching points of the audio streams based on the timestamps of the switching points of the video streams. This is simple and easy to implement and has low complexity.

In a possible design, the timestamp of the switching point of the first audio stream and the timestamp of the switching point of the second audio stream meet the following conditions, TS_sw_a1=(TS_sw_v1+T1−TS_ref_v)*frequency_a1/frequency_v1+TS_ref_a; and TS_sw_a2=(TS_sw_v2+T2−TS_ref_v)*frequency_a2/frequency_v2+TS_ref_a, where TS_sw_a1 represents the timestamp of the switching point of the first audio stream, TS_sw_v1 represents the timestamp of the switching point of the first video stream, TS_sw_a2 represents the timestamp of the switching point of the second audio stream, TS_sw_v2 represents the timestamp of the switching point of the second video stream, T1 represents the video frame duration of the first video stream, T2 represents the video frame duration of the second video stream, TS_ref_v represents a reference timestamp of a video stream, determined by using first time as a reference, TS_ref_a represents a reference timestamp of an audio stream, determined by using the first time as a reference, where the first time is any historical time on the switching device, and frequency_a1 is the sampling rate of the first audio stream, frequency_a2 is the sampling rate of the second audio stream, frequency_v1 is the clock frequency of the first video stream, and frequency_v2 is the clock frequency of the second video stream.

In a possible design, the sampling rate of the first audio stream is determined based on timestamps of any two received packets in the first audio stream and sequence numbers of the two received packets in the first audio stream, or the sampling rate of the second audio stream is determined based on timestamps of any two received packets in the second audio stream and sequence numbers of any two received packets in the second audio stream.

In a possible design, the audio parameter value includes the sequence number, and that the switching device determines an audio parameter value of a switching point of the first audio stream based on a timestamp of the switching point of the first video stream, and determines an audio parameter value of a switching point of the second audio stream based on a timestamp of the switching point of the second video stream includes the following.

The switching device determines the timestamp of the switching point of the first audio stream based on the timestamp of the switching point of the first video stream, and determines a sequence number of the switching point of the first audio stream based on the timestamp of the switching point of the first audio stream; and determines the timestamp of the switching point of the second audio stream based on the timestamp of the switching point of the second video stream, and determines a sequence number of the switching point of the second audio stream based on the timestamp of the switching point of the second audio stream.

The design provides a specific manner for determining sequence numbers of the switching points of the audio streams based on the timestamps of the switching points of the video streams. This is simple and easy to implement and has low complexity.

In a possible design, the sequence number of the switching point of the first audio stream and the sequence number of the switching point of the second audio stream meet the following conditions, SN_sw_a1=SN1+(TS_sw_a1−TS1)/AvgTS1; and SN_sw_a2=SN2+(TS_sw_a2−TS2)/AvgTS2, where AvgTS1=packetTime1*frequency_a1, AvgTS2=packetTime2*frequency_a2, where packetTime1 is a packet duration of the first audio stream, packetTime2 is a packet duration of the second audio stream, frequency_a1 represents the sampling rate of the first audio stream, and frequency_a2 represents the sampling rate of the second audio stream, and TS_sw_a1 represents the timestamp of the switching point of the first audio stream, TS_sw_a2 represents the timestamp of the switching point of the second audio stream, SN_sw_a1 represents the sequence number of the switching point of the first audio stream, SN_sw_a2 represents the sequence number of the switching point of the second audio stream, SN1 represents a sequence number of a third packet in the first audio stream, TS1 represents a timestamp of the third packet, SN2 represents a sequence number of a fourth packet in the second audio stream, and TS2 represents a timestamp of the fourth packet, where the third packet is any received packet in the first audio stream, and the fourth packet is any received packet in the second audio stream.

The design provides a specific manner for determining the sequence numbers of the switching points of the audio streams. This is simple and easy to implement and has low complexity.

In a possible design, when the video parameter value includes the sequence number, that the switching device determines the video parameter value of the switching point of the first video stream based on the synchronization relationship and a video parameter value of the first packet, and determines the video parameter value of the switching point of the second video stream based on the synchronization relationship and a video parameter value of the second packet includes the following.

The switching device determines a sequence number of the switching point of the first video stream based on the synchronization relationship, a sequence number of the first packet, and a quantity of packets in a video frame in the first video stream, and determines a sequence number of the switching point of the second video stream based on the synchronization relationship, a sequence number of the second packet, and a quantity of packets in a video frame in the second video stream.

The design provides a specific manner for determining sequence numbers of the switching points of the video streams. This is simple and easy to implement and has low complexity.

In a possible design, the sequence number of the switching point of the first video stream and the sequence number of the switching point of the second video stream meet the following conditions, if the first video stream and the second video stream are synchronized, SN_sw_v1=FT_SN1+N*M1, and SN_sw_v2=FT_SN2+N*M2; if the first video stream is later than the second video stream, SN_sw_v1=FT_SN1+(N+1)*M1, and SN_sw_v2=FT_SN2+N*M2; or if the first video stream is earlier than the second video stream, SN_sw_v1=FT_SN1+N*M1, and SN_sw_v2=FT_SN2+(N+1)*M2, where M1 represents a quantity of packets included in the first video frame, M2 represents a quantity of packets included in the second video frame, SN_sw_v1 represents the sequence number of the switching point of the first video stream, SN_sw_v2 represents the sequence number of the switching point of the second video stream, FT_SN1 represents the sequence number of the first packet, FT_SN2 represents the sequence number of the second packet, and N is an integer greater than 0.

The design provides a specific manner for determining the sequence numbers of the switching points of the video streams. This is simple and easy to implement and has low complexity.

In a possible design, the quantity of packets in the video frame in the first video stream is determined based on a sequence number difference between received frame trailer packets in two adjacent video frames in the first video stream, and the quantity of packets in the video frame in the second video stream is determined based on a sequence number difference between received frame trailer packets in two adjacent video frames in the second video stream; or the quantity of packets in the video frame in the first video stream is determined based on a sequence number difference between received frame header packets in two adjacent video frames in the first video stream, and the quantity of packets in the video frame in the second video stream is determined based on a sequence number difference between received frame header packets in two adjacent video frames in the second video stream.

In the design, a quantity of packets in the video frames is determined by using a sequence number difference between two adjacent frame trailer packets or a sequence number difference between two adjacent frame header packets. This is simple and easy to implement, and has low complexity.

In a possible design, the video frame duration of the first video stream is determined based on a timestamp difference between received frame trailer packets in two adjacent video frames in the first video stream, and the video frame duration of the second video stream is determined based on a timestamp difference between received frame trailer packets in two adjacent video frames in the second video stream; or the video frame duration of the first video stream is determined based on a timestamp difference between received frame header packets in two adjacent video frames in the first video stream, and the video frame duration of the second video stream is determined based on a timestamp difference between received frame header packets in two adjacent video frames in the second video stream.

In the design, video frame durations are determined by using a timestamp difference between the two adjacent frame trailer packets or a timestamp difference between the two adjacent frame header packets. This is simple and easy to implement, and has low complexity.

In a possible design, the two adjacent video frames in the first video stream are two video frames in the first video stream that are received before the switching instruction is received, and the two adjacent video frames in the second video stream are two video frames in the second video stream that are received before the switching instruction is received; and the first video frame is a previous video frame of a video frame in which a packet that is in the first video stream and that is received when the switching instruction is received is located, and the second video frame is a previous video frame of a video frame in which a packet that is in the second video stream and that is received when the switching instruction is received is located; or the first video frame is a next video frame of a video frame in which a packet that is in the first video stream and that is received when the switching instruction is received is located, and the second video frame is a next video frame of a video frame in which a packet that is in the second video stream and that is received when the switching instruction is received is located.

In the design, the video frame durations and the quantity of packets included in the video frames are determined before the switching instruction is received. Switching points are determined based on packets in the video frames received when the switching instruction is received. This can reduce a switching delay to some extent.

In a possible design, the two adjacent video frames in the first video stream are a video frame in which a packet that is in the first video stream and that is received when the switching instruction is received is located and a next video frame of the video frame, and the two adjacent video frames in the second video stream are a video frame in which a packet that is in the second video stream and that is received when the switching instruction is received is located and a next video of the video frame.

The first video frame is a next video frame of a video frame in which a packet that is in the first video stream and that is received when the switching instruction is received is located, and the second video frame is a next video frame of a video frame in which a packet that is in the second video stream and that is received when the switching instruction is received is located.

In the design, the video frame durations and the quantity of packets included in the video frames are determined after the switching instruction is received, so that video frame durations of several video streams and a quantity of packets in the several video streams can be pertinently determined. This can improve resource utilization to some extent.

In a possible design, the first packet is a frame trailer packet in the first video frame, and the second packet is a frame trailer packet in the second video frame; or the first packet is a frame header packet in the first video frame, and the second packet is a frame header packet in the second video frame.

In the design, the switching points are determined based on frame trailer packets in the video streams. This is simple and easy to implement, and has low complexity.

An embodiment of this application provides an audio stream and video stream synchronous switching apparatus, including a receiving unit configured to receive a switching instruction, where the switching instruction is used to instruct to switch from a transmitted first audio stream to a second audio stream and switch from a transmitted first video stream to a second video stream; a processing unit configured to determine a video parameter value of a switching point of the first video stream and a video parameter value of a switching point of the second video stream, where the video parameter value includes a timestamp and/or a sequence number, determine an audio parameter value of a switching point of the first audio stream based on a timestamp of the switching point of the first video stream, and determine an audio parameter value of a switching point of the second audio stream based on the video parameter value of the switching point of the second video stream, where the audio parameter value includes a timestamp and/or a sequence number; and a sending unit configured to switch packets that are in the first video stream and whose video parameter values are greater than the video parameter value of the switching point of the first video stream to packets that are in the second video stream and whose video parameter values are greater than the video parameter value of the switching point of the second video stream; and switch packets that are in the first audio stream and whose audio parameter values are greater than the audio parameter value of the switching point of the first audio stream to packets that are in the second audio stream and whose audio parameter values are greater than the audio parameter value of the switching point of the second audio stream.

In a possible design, when determining the video parameter value of the switching point of the first video stream and the video parameter value of the switching point of the second video stream, the processing unit is specifically configured to determine a synchronization relationship between the first video stream and the second video stream based on a timestamp of a first packet in the first video stream and a timestamp of a second packet in the second video stream, where a time period of receiving a first video frame to which the first packet belongs overlaps a time period of receiving a second video frame to which the second packet belongs; and determine the video parameter value of the switching point of the first video stream based on the synchronization relationship and a video parameter value of the first packet, and determine the video parameter value of the switching point of the second video stream based on the synchronization relationship and a video parameter value of the second packet.

In a possible design, when the video parameter value includes the timestamp, and when determining the video parameter value of the switching point of the first video stream based on the synchronization relationship and the video parameter value of the first packet, and determining the video parameter value of the switching point of the second video stream based on the synchronization relationship and the video parameter value of the second packet, the processing unit is specifically configured to determine the timestamp of the switching point of the first video stream based on the synchronization relationship, the timestamp of the first packet, and a video frame duration of the first video stream; and determine the timestamp of the switching point of the second video stream based on the synchronization relationship, the timestamp of the second packet, and a video frame duration of the second video stream.

In a possible design, the timestamp of the switching point of the first video stream and the timestamp of the switching point of the second video stream meet the following conditions, if the first video stream and the second video stream are synchronized, $TS\_sw\_v1=FT\_TS1+N*T1$, and $TS\_sw\_v2=FT\_TS2+N*T3$; if the first video stream is later than the second video stream, $TS\_sw\_v1=FT\_TS1+(N+1)*T1$, and $TS\_sw\_v2=FT\_TS2+N*T2$; or if the first video stream is earlier than the second video stream, $TS\_sw\_v1=FT\_TS1+N*T1$, and $TS\_sw\_v2=FT\_TS2+(N+2)*T2$, where T1 represents the video frame duration of the first video stream, T2 represents the video frame duration of the second video stream, TS_sw_v1 represents the timestamp of the switching point of the first video stream, TS_sw_v2 represents the timestamp of the switching point of the second video stream, and N is an integer greater than 0.

In a possible design, the audio parameter value includes the timestamp, and when determining the audio parameter value of the switching point of the first audio stream based on the timestamp of the switching point of the first video stream, and determining the audio parameter value of the switching point of the second audio stream based on the timestamp of the switching point of the second video stream, the processing unit is specifically configured to determine a timestamp of the switching point of the first audio stream based on the timestamp of the switching point of the first video stream, the video frame duration of the first video stream, a clock frequency of the first video stream, and a sampling rate of the first audio stream; and determine a timestamp of the switching point of the first audio stream based on the timestamp of the switching point of the second video stream, the video frame duration of the second video stream, a clock frequency of the second video stream, and a sampling rate of the first audio stream.

In a possible design, the timestamp of the switching point of the first audio stream and the timestamp of the switching point of the second audio stream meet the following conditions, $TS\_sw\_a1=(TS\_sw\_v1+T1-TS\_ref\_v)*frequency\_a1/frequency\_v1+TS\_ref\_a$; and $TS\_sw\_a2=(TS\_sw\_v2+T2-TS\_ref\_v)*frequency\_a2/frequency\_v2+TS\_ref\_a$, where TS_sw_a1 represents the timestamp of the switching point of the first audio stream, TS_sw_v1 represents the timestamp of the switching point of the first video stream, TS_sw_a2 represents the timestamp of the switching point of the second audio stream, TS_sw_v2 represents the timestamp of the switching point of the second video stream, T1 represents the video frame duration of the first video stream, T2 represents the video frame duration of the second video stream, TS_ref_v represents a reference timestamp of a video stream, determined by using first time as a reference, TS_ref_a represents a reference timestamp of an audio stream, determined by using the first time as a reference, where the first time is any historical time on the switching apparatus, and frequency_a1 is the sampling rate of the first audio stream, frequency_a2 is the sampling rate of the second audio stream, frequency_v1 is the clock frequency of the first video stream, and frequency_v2 is the clock frequency of the second video stream.

In a possible design, the sampling rate of the first audio stream is determined based on timestamps of any two received packets in the first audio stream and sequence numbers of the two received packets in the first audio stream, or the sampling rate of the second audio stream is determined based on timestamps of any two received packets in the second audio stream and sequence numbers of any two received packets in the second audio stream.

In a possible design, the audio parameter value includes the sequence number, and when determining the audio parameter value of the switching point of the first audio stream based on the timestamp of the switching point of the first video stream, and determining the audio parameter value of the switching point of the second audio stream based on the timestamp of the switching point of the second video stream, the processing unit is specifically configured to determine the timestamp of the switching point of the first audio stream based on the timestamp of the switching point of the first video stream, and determine a sequence number of the switching point of the first audio stream based on the timestamp of the switching point of the first audio stream; and determine the timestamp of the switching point of the second audio stream based on the timestamp of the switching point of the second video stream, and determine a sequence number of the switching point of the second audio stream based on the timestamp of the switching point of the second audio stream.

In a possible design, the sequence number of the switching point of the first audio stream and the sequence number of the switching point of the second audio stream meet the following conditions, $SN\_sw\_a1 = SN1 + (TS\_sw\_a1 - TS1)/AvgTS1$; and $SN\_sw\_a2 = SN2 + (TS\_sw\_a2 - TS2)/AvgTS2$, where $AvgTS1 = packetTime1 * frequency\_a1$, $AvgTS2 = packetTime2 * frequency\_a2$, where packetTime1 is a packet duration of the first audio stream, packetTime2 is a packet duration of the second audio stream, frequency\_a1 represents the sampling rate of the first audio stream, and frequency\_a2 represents the sampling rate of the second audio stream, and TS\_sw\_a1 represents the timestamp of the switching point of the first audio stream, TS\_sw\_a2 represents the timestamp of the switching point of the second audio stream, SN\_sw\_a1 represents the sequence number of the switching point of the first audio stream, SN\_sw\_a2 represents the sequence number of the switching point of the second audio stream, SN1 represents a sequence number of a third packet in the first audio stream, TS1 represents a timestamp of the third packet, SN2 represents a sequence number of a fourth packet in the second audio stream, and TS2 represents a timestamp of the fourth packet, where the third packet is any received packet in the first audio stream, and the fourth packet is any received packet in the second audio stream.

In a possible design, the audio parameter value includes the sequence number, and when determining the video parameter value of the switching point of the first video stream based on the synchronization relationship and the video parameter value of the first packet, and determining the video parameter value of the switching point of the second video stream based on the synchronization relationship and the video parameter value of the second packet, the processing unit is specifically configured to determine a sequence number of the switching point of the first video stream based on the synchronization relationship, a sequence number of the first packet, and a quantity of packets in a video frame in the first video stream; and determine a sequence number of the switching point of the second video stream based on the synchronization relationship, a sequence number of the second packet, and a quantity of packets in a video frame in the second video stream.

In a possible design, the sequence number of the switching point of the first video stream and the sequence number of the switching point of the second video stream meet the following conditions, if the first video stream and the second video stream are synchronized, $SN\_sw\_v1 = FT\_SN1 + N*M1$, and $SN\_sw\_v2 = FT\_SN2 + N*M2$; if the first video stream is later than the second video stream, $SN\_sw\_v1 = FT\_SN1 + (N+1)*M1$, and $SN\_sw\_v2 = FT\_SN2 + N*M2$; or if the first video stream is earlier than the second video stream, $SN\_sw\_v1 = FT\_SN1 + N*M1$, and $SN\_sw\_v2 = FT\_SN2 + (N+1)*M2$, where M1 represents a quantity of packets included in the first video frame, M2 represents a quantity of packets included in the second video frame, SN\_sw\_v1 represents the sequence number of the switching point of the first video stream, SN\_sw\_v2 represents the sequence number of the switching point of the second video stream, FT\_SN1 represents the sequence number of the first packet, FT\_SN2 represents the sequence number of the second packet, and N is an integer greater than 0.

In a possible design, the quantity of packets in the video frame in the first video stream is determined based on a sequence number difference between received frame trailer packets in two adjacent video frames in the first video stream, and the quantity of packets in the video frame in the second video stream is determined based on a sequence number difference between received frame trailer packets in two adjacent video frames in the second video stream; or the quantity of packets in the video frame in the first video stream is determined based on a sequence number difference between received frame header packets in two adjacent video frames in the first video stream, and the quantity of packets in the video frame in the second video stream is determined based on a sequence number difference between received frame header packets in two adjacent video frames in the second video stream.

In a possible design, the video frame duration of the first video stream is determined based on a timestamp difference between received frame trailer packets in two adjacent video frames in the first video stream, and the video frame duration of the second video stream is determined based on a timestamp difference between received frame trailer packets in two adjacent video frames in the second video stream; or the video frame duration of the first video stream is determined based on a timestamp difference between received frame header packets in two adjacent video frames in the first video stream, and the video frame duration of the second video stream is determined based on a timestamp difference between received frame header packets in two adjacent video frames in the second video stream.

In a possible design, the two adjacent video frames in the first video stream are two video frames in the first video stream that are received before the switching instruction is received, and the two adjacent video frames in the second video stream are two video frames in the second video stream that are received before the switching instruction is received; and the first video frame is a previous video frame of a video frame in which a packet that is in the first video stream and that is received when the switching instruction is received is located, and the second video frame is a previous video frame of a video frame in which a packet that is in the second video stream and that is received when the switching instruction is received is located; or the first video frame is a next video frame of a video frame in which a packet that is in the first video stream and that is received when the switching instruction is received is located, and the second video frame is a next video frame of a video frame in which a packet that is in the second video stream and that is received when the switching instruction is received is located.

In a possible design, the two adjacent video frames in the first video stream are a video frame in which a packet that is in the first video stream and that is received when the switching instruction is received is located and a next video frame of the video frame, and the two adjacent video frames in the second video stream are a video frame in which a packet that is in the second video stream and that is received when the switching instruction is received is located and a next video of the video frame.

The first video frame is a next video frame of a video frame in which a packet that is in the first video stream and that is received when the switching instruction is received is located, and the second video frame is a next video frame of a video frame in which a packet that is in the second video stream and that is received when the switching instruction is received is located.

In a possible design, the first packet is a frame trailer packet in the first video frame, and the second packet is a frame trailer packet in the second video frame; or the first packet is a frame header packet in the first video frame, and the second packet is a frame header packet in the second video frame.

According to a third aspect, an embodiment of this application further provides an apparatus. The apparatus is used in the switching device. For beneficial effects, refer to the description in the first aspect. Details are not described herein again. A structure of the communications apparatus includes a processor and a transceiver, and may further include a memory. The processor is configured to support the switching device in performing a corresponding function in the method in the first aspect. The memory is coupled to the processor and stores a program instruction and data that are necessary for the communications apparatus. The transceiver is configured to communicate with another device.

According to a fourth aspect, this application further provides a computer-readable storage medium. The computer-readable storage medium stores an instruction. When the instruction is run on a computer, the computer is enabled to perform the method according to the first aspect.

According to a fifth aspect, this application further provides a computer program product including an instruction. When the computer program product runs on a computer, the computer is enabled to perform the method according to the first aspect.

According to a sixth aspect, this application further provides a computer chip. The chip is connected to a memory. The chip is configured to read and execute a software program stored in the memory, to perform the method in the first aspect.

DESCRIPTION OF EMBODIMENTS

Embodiments of this application may be used in scenarios in which audio streams carried on IP networks need to be switched, such as a general control system of a broadcast production and broadcasting network, a general control system of a television production and broadcasting network, a television studio, and a broadcast domain.

Figure 1:
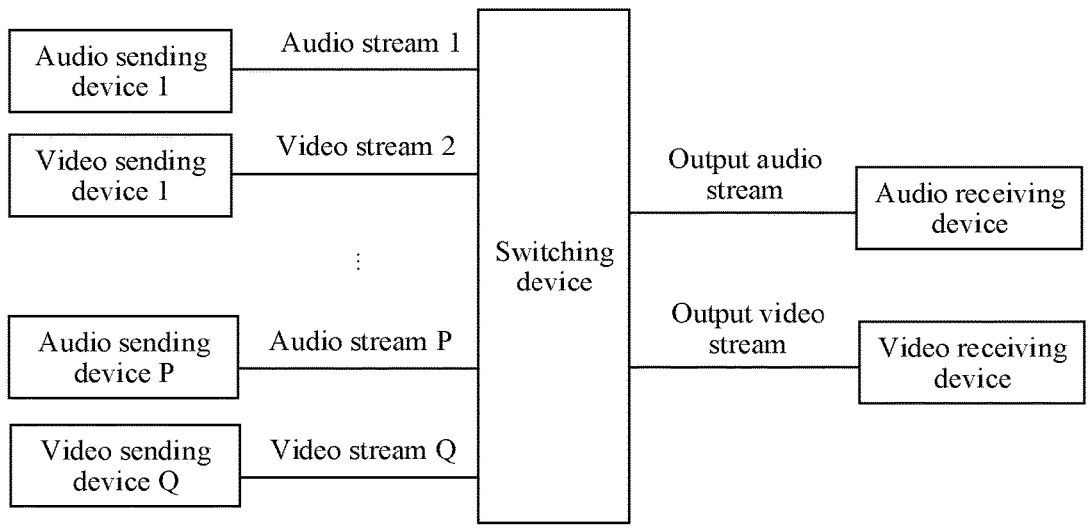
FIG. 1 is a schematic diagram of a structure of a switching system according to an embodiment of this application.

FIG. 1 is a schematic diagram of an example of a structure of a switching system. The system includes P audio sending devices, Q video sending devices, a switching device, an audio receiving device, and a video receiving device, where both P and Q are integers greater than 1. An audio sending device is configured to send an audio stream to the switching device. The video sending device is configured to send a video stream to the switching device. The switching device is responsible for transmitting one of P audio streams output by the P audio sending devices and one of Q video streams output by the Q video sending devices to a downstream device. The downstream device transmits the audio stream to the audio receiving device, and transmits the video stream to the video receiving device.

The switching device in this embodiment of this application may be an IP network switching device used in a production and broadcasting IP network. For example, the switching device is a router, a switch, or a virtual switch, and may be one or more servers, a virtualization platform, a cloud computing service center, or the like.

For example, the switching system may further include a management device configured to send a switching instruction to the switching device. The management device may be connected to the switching device through a wired network or a wireless network.

Optionally, the wireless network or the wired network uses a standard communications technology and/or a standard communications protocol. A network is usually an internet, but may also be any network, including but not limited to any combination of a local area network (LAN), a metropolitan area network (MAN), a wide area network (WAN), a mobile network, a wired network, a wireless network, a private network, or a virtual private network.

The Society of Motion Picture and Television Engineers (SMPTE) 2110 standard is used to separate audio, a video, and auxiliary data. Each entity stream can be transmitted, switched, aggregated, and reassembled separately to improve production and broadcasting convenience of an additional subtitle, a title, teletext, and multi-language audio. The auxiliary data may be the subtitle, the title, the teletext, the multi-language audio, and the like. The SMPTE 2110 standard introduces a new requirement in separate transmission of an audio stream, a video stream, and an auxiliary data stream. In other words, audio and video synchronous switching needs to be ensured during the switching. Currently, the audio stream and the video stream are transmitted separately. Audio stream switching and video stream switching are independently completed. As a result, the synchronous switching cannot be accurately completed.

In this embodiment of this application, a stream including audio data is referred to as the audio stream, and a stream including video data is referred to as the video stream. The audio data may be data including sounds that can be heard by humans, for example, data including sounds generated by a speech, singing, and musical instrument, or may be multilingual audio data generated in production. The video data may be a static picture that cannot be identified by human eyes, and seems to be a smooth and continuous visual effect. Data corresponding to the continuous picture may be referred to as the video data. For example, the video data may include image data, data including a produced subtitle or a title, teletext data, or the like.

In addition, in this embodiment of this application, a video stream transmitted before the switching may be referred to as a switched-out video stream, and a video stream transmitted after the switching may be referred to as a switched-in video stream. An audio stream transmitted before the switching may be referred to as a switched-out audio stream, and an audio stream transmitted after the switching may be referred to as a switched-in audio stream. In subsequent descriptions of this embodiment of this application, an example in which a first audio stream is a switched-out audio stream, a second audio stream is a switched-in audio stream, a first video stream is a switched-out video stream, and a second video stream is a switched-in video stream is used.

In an IP network, the audio stream and video stream synchronous switching needs to meet the following requirements.

1. Clean switching of video streams needs to be implemented. The video streams need to be switched at a video frame boundary. During the switching, the switched-out video stream and the switched-in video stream can be continuous in a time dimension. No more frames or fewer frames are allowed. In other words, no video impairment (such as a black screen, an erratic display, screen scrolling, or a static frame) occurs.

Figure 2:
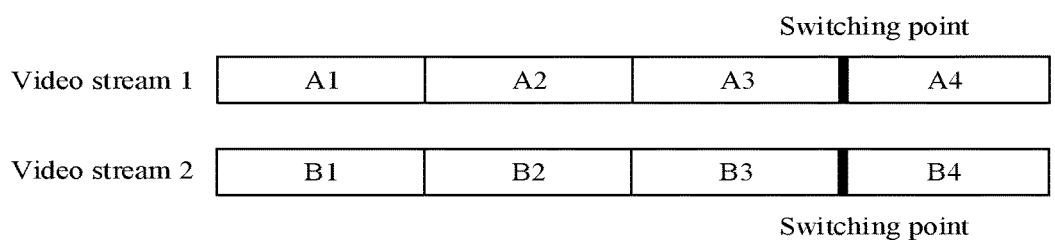
FIG. 2 is a schematic diagram of a video stream according to an embodiment of this application.

As shown in FIG. 2, a switched-in video stream A starts to be forwarded at a frame 4, and a switched-out video stream B starts to be discarded at a frame 4.

2. Audio streams are switched synchronously with the video streams. Switching points of the audio streams are as close as possible to switching points of the video streams in a time dimension, and the audio streams cannot be switched earlier or later than the video streams.

Figure 3:
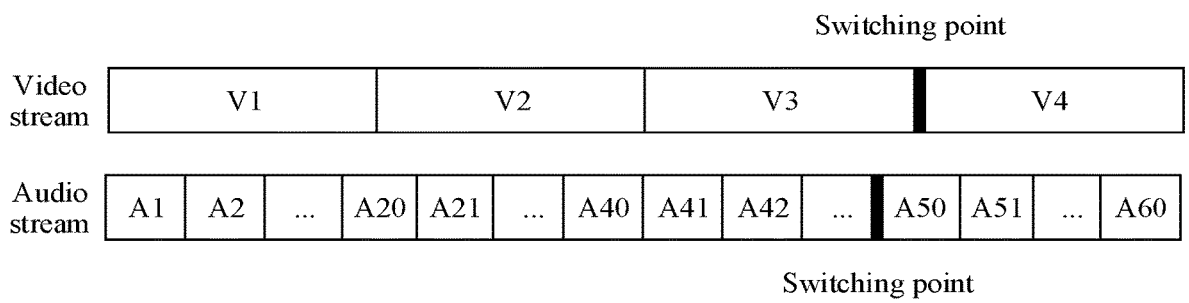
FIG. 3 is a schematic diagram of synchronization between an audio stream and a video stream according to an embodiment of this application.

As shown in FIG. 3, the video streams start to be switched at frames V4. In this case, timestamps at the frames V4 are TS_v. Timestamps TS_a of packets in the audio streams at switching points A51 need to be close to TS_v in a same time dimension as possible.

However, characteristics of a production and broadcasting network and processing on the video streams are not considered in a design of an IP network device. The IP network device forwards the video streams in packets. The IP network device does not identify the frame boundary in the video streams included in a packet for forwarding (switching), or synchronize the video streams and the audio streams in the time dimension. Therefore, when the switching device is used to switch the video streams and the audio streams, it is found that the switching device does not consider a relationship between the audio streams and the video streams. Locations are random when multicast forwarding starts/stops. As a result, various impairments, such as pixel missing, pixel overlapping, frame asynchronization, and audio and video asynchronization, occur in switching pictures.

Based on this, embodiments of this application provide an audio stream and video stream synchronous switching method and apparatus, to resolve a problem that synchronous switching cannot be completed. Because a problem-resolving principle of the method is similar to a problem-resolving principle of the apparatus, implementations of both the apparatus and the method may mutually refer to each other. No repeated description is provided.

Figure 4A:
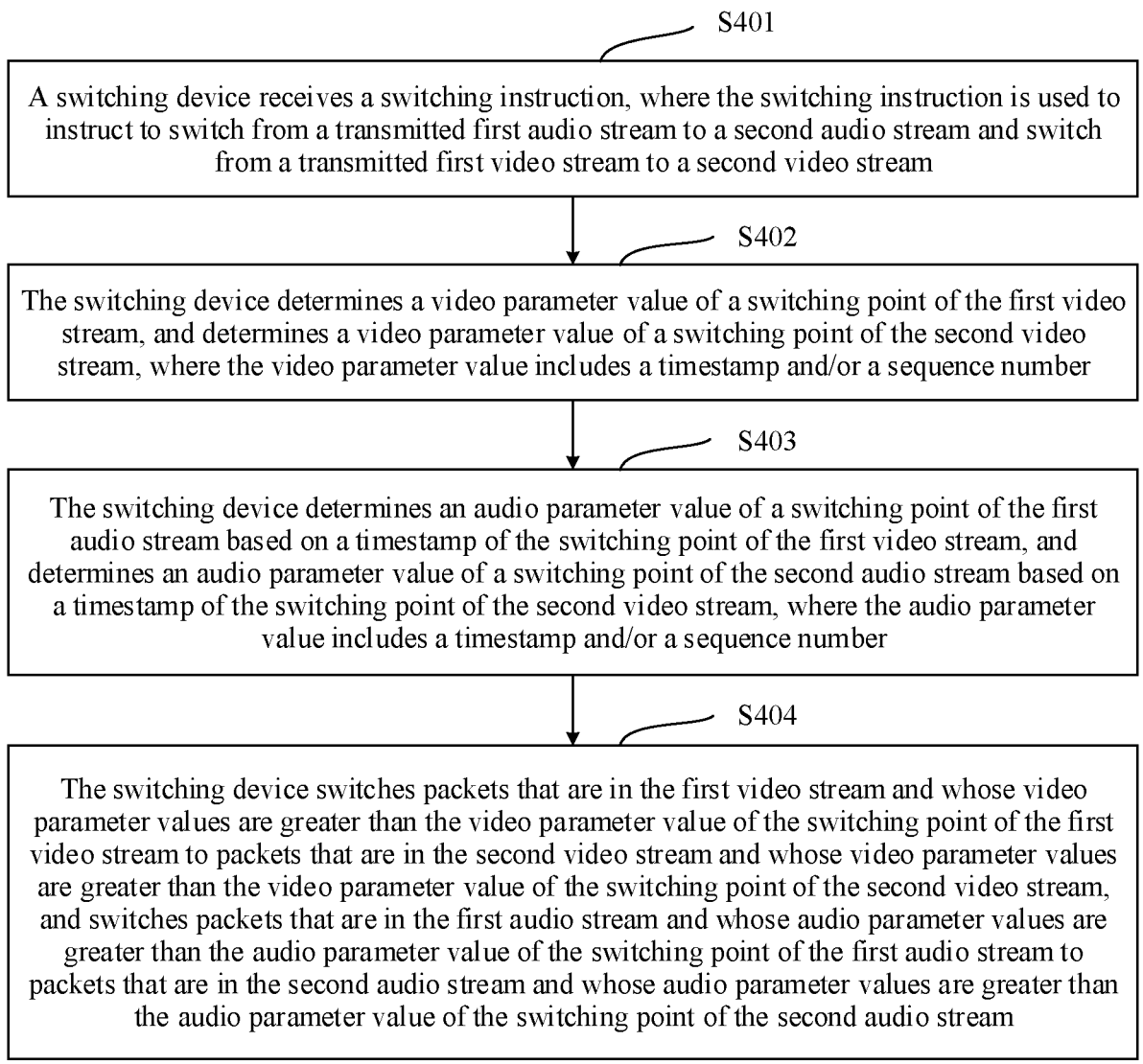
FIG. 4A is a flowchart of an audio stream and video stream synchronous switching method according to an embodiment of this application.

FIG. 4A is a flowchart of an audio stream and video stream synchronous switching method according to an embodiment of this application. The method includes steps S401 to S405.

S401. A switching device receives a switching instruction, where the switching instruction is used to instruct to switch from a transmitted first audio stream to a second audio stream and switch from a transmitted first video stream to a second video stream.

S402. The switching device determines a video parameter value of a switching point of the first video stream, and determines a video parameter value of a switching point of the second video stream, where the video parameter value includes a timestamp and/or a sequence number.

S403. The switching device determines an audio parameter value of a switching point of the first audio stream based on a timestamp of the switching point of the first video stream, and determines an audio parameter value of a switching point of the second audio stream based on a timestamp of the switching point of the second video stream, where the audio parameter value includes a timestamp and/or a sequence number.

It should be understood that, when the video parameter value includes only the sequence number, before performing the step S403, the switching device first determines the timestamp of the switching point of the first video stream and the timestamp of the switching point of the second video stream.

S404. The switching device switches packets that are in the first video stream and whose video parameter values are greater than the video parameter value of the switching point of the first video stream to packets that are in the second video stream and whose video parameter values are greater than the video parameter value of the switching point of the second video stream, and switches packets that are in the first audio stream and whose audio parameter values are greater than the audio parameter value of the switching point of the first audio stream to packets that are in the second audio stream and whose audio parameter values are greater than the audio parameter value of the switching point of the second audio stream.

The step S402 in which the switching device determines the video parameter value of the switching point of the first video stream, and determines the video parameter value of the switching point of the second video stream is implemented in the following manner.

The switching device determines a synchronization relationship between the first video stream and the second video stream based on a timestamp of a first packet in the first video stream and a timestamp of a second packet in the second video stream. A time period of receiving a first video frame in the video stream to which the first packet belongs overlaps a time period of receiving a second video frame in the second video stream to which the second packet belongs. The switching device determines the video parameter value of the switching point of the first video stream based on the synchronization relationship and a video parameter value of the first packet, and determines the video parameter value of the switching point of the second video stream based on the synchronization relationship and a video parameter value of the second packet. The video parameter value includes the timestamp and/or the sequence number.

It should be noted that the time period of receiving the first video frame overlaps the time period of receiving the second video frame indicates that a time period of receiving a packet encapsulating the first video frame overlaps a time period of receiving a packet encapsulating the second video frame.

For example, the first packet may be a frame trailer packet in the first video frame, and the second packet is a frame trailer packet in the second video frame. The first packet is an $i^{th}$ packet in the first video frame, and the second packet is an $i^{th}$ packet in the second video frame. Alternatively, the first packet may be a frame header packet in the first video frame, and the second packet may be a frame header packet in the second video frame. The packet in this embodiment of this application may be a RTP packet.

It should be noted that video frames in a video are encapsulated in a plurality of packets for transmission, and a last packet in the plurality of packets encapsulating the video frames is referred to as a frame trailer packet. The video frame described in this embodiment of this application is an uncompressed video frame. The video frame may be a YUV ("Y" represents luminance (Luma), and "U" and "V" represent chrominance (chroma) and concentration video frame, or an RGB (R represents red, G represents green, and B represents blue) video frame. A quantity of packets in a single video frame in a same video stream (namely, a quantity of packets for encapsulating a video frame in the video stream) is generally the same, usually up to several thousand.

Figure 4B:
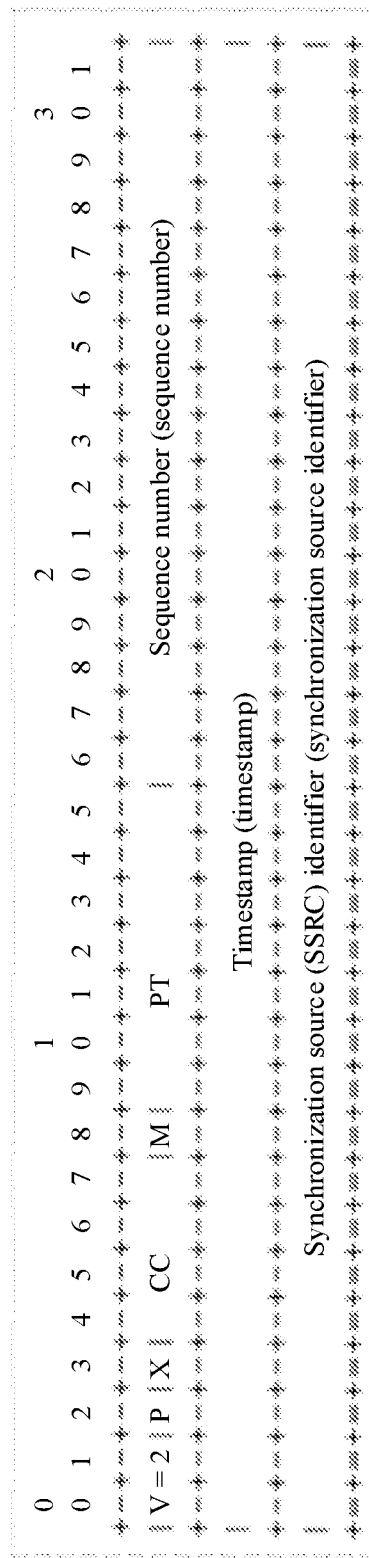
FIG. 4B is a schematic diagram of a structure of an RTP packet header according to an embodiment of this application.

An RTP packet is used as an example. According to an RTP packet header format formulated in the request for comments (RFC) 3550, referring to FIG. 4B, a value of a marker (M) field in an RTP packet header is used to indicate whether the RTP packet is a frame trailer packet. If the value of the M is 1, it indicates that the RTP packet is the frame trailer packet. If the value of the M is 0, it indicates that the RTP packet is not the frame trailer packet. Usually, each audio frame in audio is encapsulated in a packet for transmission. In FIG. 4B, meanings of other fields are described as follows.

A V indicates a version, and V=2 indicates an RTP version. AP is a padding identifier, and occupies one bit. If a padding bit is set, an additional padding word is included in a packet trailer, and the padding word is not a valid payload. An X is an extension bit. A PT indicates a payload type. A sequence number indicates a sequence number of the RTP packet. The sequence number is incremented by 1 each time an RTP packet is added. A timestamp indicates a timestamp. A synchronization source (SSRC) Identifier indicates a synchronization source. The identifier is randomly selected. Two synchronization sources participating in a same video conference cannot have a same SSRC.

In the step S405, the switching device switches the packets that are in the first audio stream and whose audio parameter values are greater than the audio parameter value of the switching point of the first audio stream to the packets that are in the second audio stream and whose audio parameter values are greater than the audio parameter value of the switching point of the second audio stream. In other words, the switching device discards the packets that are in the first audio stream and whose audio parameter values are greater than the audio parameter value of the switching point of the first audio stream and forwards the packets that are in the second audio stream and whose audio parameter values are greater than the audio parameter value of the switching point of the second audio stream. It should be noted that, after determining the audio parameter value of the switching point of the first audio stream, the switching device may receive packets that are in the first audio stream and whose audio parameter values are less than or equal to the audio parameter value of the switching point of the first audio stream, and may forward the part, namely, the packets that are in the first audio stream and whose audio parameter values are less than or equal to the audio parameter value of the switching point of the first audio stream. In addition, the switching device may discard packets that are received after the audio parameter value of the switching point of the second audio stream is determined and whose audio parameter values are less than or equal to the audio parameter value of the switching point of the second audio stream.

Likewise, the switching device switches the packets that are in the first video stream and whose video parameter values are greater than the video parameter value of the switching point of the first video stream to packets that are in the second video stream and whose video parameter values are greater than the video parameter value of the switching point of the second video stream. In other words, the switching device discards the packets that are in the first video stream and whose video parameter values are greater than the video parameter value of the switching point of the first video stream and forwards the packets that are in the second video stream and whose video parameter values are greater than the video parameter value of the switching point of the second video stream. It should be noted that, after determining the video parameter value of the switching point of the first video stream, the switching device may receive packets that are in the first video stream and whose video parameter values are less than or equal to the video parameter value of the switching point of the first video stream, and may forward the part, namely, the packets that are in the first video stream and whose video parameter values are less than or equal to the video parameter value of the switching point of the first video stream. In addition, the switching device may discard packets that are received after the video parameter value of the switching point of the second video stream is determined and whose video parameter values are less than or equal to the video parameter value of the switching point of the second video stream.

In a possible example, the switching device may output audio streams and video streams through a same port or different ports. In an example, when the same port is used to output the audio streams and the video streams, and the switching device includes at least two output ports, for example, a port 1 and a port 2, the port 1 is used to connect to a monitoring device, and the port 2 is used to connect to a downstream device. Before the switching is performed, the switching device sends the first audio stream, the second audio stream, the first video stream, and the second video stream to the monitoring device through the port 1, and sends the first audio stream and the first video stream to the downstream device through the port 2. The second audio stream and the second video stream are not forwarded through the port 2, and may be considered to be discarded. After the switching is performed, the switching device still sends the first audio stream, the second audio stream, the first video stream, and the second video stream to the monitoring device through the port 1, and forwards the second audio stream and the second video stream to the downstream device through the port 2. The first audio stream and the first video stream are no longer forwarded to the downstream device, and the first audio stream and the first video stream may be considered to be discarded on the port 2. In another example, when the different ports are used to output the audio streams and the video streams, and the switching device includes at least four output ports, for example, a port 1, a port 2, a port 3, and a port 4, the port 1 is used to transmit the audio streams and is connected to a monitoring device. The port 2 is used to transmit the audio streams and is connected to a downstream device. The port 3 is used to transmit the video streams and is connected to the monitoring device. The port 4 is used to transmit the video streams and is connected to the downstream device. Before the switching is performed, the switching device sends the first audio stream and the second audio stream to the monitoring device through the port 1, and sends the first audio stream to the downstream device through the port 2. The second audio stream is not forwarded through the port 2, and may be considered to be discarded. The switching device sends the first video stream and the second video stream to the monitoring device through the port 3, and sends the first video stream to the downstream device through the port 4. The second video stream is not forwarded through the port 4, and may be considered to be discarded. After the switching is performed, the switching device still sends the first audio stream and the second audio stream to the monitoring device through the port 1, and forwards the second audio stream to the downstream device through the port 2. The first audio stream is no longer forwarded to the downstream device, and the first audio stream may be considered to be discarded on the port 2. The switching device sends the first video stream and the second video stream to the monitoring device through the port 3, and forwards the second video stream to the downstream device through the port 4, but the first video stream is no longer forwarded to the downstream device. The first video stream may be considered to be discarded on the port 4.

Optionally, the switching instruction may further carry a port number. The port number is used to indicate a port that switches and outputs the audio streams and the video streams.

In this embodiment of this application, when the switching device switches the video streams and the audio streams separately, determined audio parameter values of switching points may be the same as or different from video parameter values of switching points. For example, the timestamp and/or sequence number may be used as the video parameter values when the switching device switches the video streams, and the timestamp and/or sequence number may be used as the audio parameter values when the switching device switches the audio streams. There are eight combination manners.

(1) The video parameter value is the timestamp, and the audio parameter value is the sequence number.

(2) The video parameter value is the sequence number, and the audio parameter value is the timestamp.

(3) The video parameter value is the timestamp, and the audio parameter value is the timestamp.

(4) The video parameter value is the sequence number, and the audio parameter value is the sequence number.

(5) The video parameter value is the timestamp and the sequence number, and the audio parameter value is the timestamp.

(6) The video parameter value is the timestamp and the sequence number, and the audio parameter value is the sequence number.

(7) The video parameter value is the timestamp, and the audio parameter value is the timestamp and the sequence number.

(8) The video parameter value is the sequence number, and the audio parameter value is the sequence number and the timestamp.

The following describes in detail a manner of determining timestamps of the video, sequence numbers of the video, timestamps of the audio, and sequence numbers of the audio.

For example, the video parameter value includes the timestamp. That the switching device determines the timestamp of the switching point of the first video stream based on the synchronization relationship and the timestamp of the first packet, and determines the timestamp of the switching point of the second video stream based on the synchronization relationship and the timestamp of the second packet may be implemented in the following manner.

The switching device determines the timestamp of the switching point of the first video stream based on the synchronization relationship, the timestamp of the first packet, and a video frame duration of the first video stream, and determines the timestamp of the switching point of the second video stream based on the synchronization relationship, the timestamp of the second packet, and a video frame duration of the second video stream.

In this embodiment of this application, a time period of receiving both the first video frame and the second video frame that are used to determine the synchronization relationship overlaps in this embodiment of this application. In other words, a time period of receiving both the first video frame and the second video frame is as close as possible.

For example, both the first packet and the second packet are frame trailer packets. The switching device may use, as the first packet and the second packet separately, last $x^{th}$ (for example, last) frame trailer packets that are in the first video stream and the second video stream and that are received before the switching points are determined (for example, before the switching instruction is received), where x is a natural number. It should be noted that, if the switching points are determined immediately after the switching instruction is received, it may be considered that time at which the switching instruction is received is time at which the switching points are determined. If the switching points are determined when at least one frame trailer packet in the second video stream is received after the switching instruction is received and at least one frame trailer packet in the first video stream is received, time at which the at least one frame trailer packet in the second video stream is received after the at least one frame trailer packet in the first video stream is received is time at which the switching points are determined. For example, after the switching instruction is received, a frame trailer packet a in the first video stream is received, and a frame trailer packet b in the second video stream is successively received, the switching points are determined immediately after the frame trailer packet b is received. Time at which the frame trailer packet b is received is the time at which the switching points are determined. The frame trailer packet a and the frame trailer packet b are used as the first packet and the second packet respectively. For another example, after the switching instruction is received, a frame trailer packet c and a frame trailer packet d that are in the first video stream are received, and a frame trailer packet e in the second video stream is successively received, the switching points are determined immediately after the frame trailer packet e is received. Time at which the frame trailer packet e is received is the time at which the switching points are determined. The frame trailer packet d and the frame trailer packet e are used as the first packet and the second packet respectively. The switching device may also use, as the first packet and the second packet separately, $y^{th}$ (for example, first) frame trailer packets that are in the first video stream and the second video stream and that are received after the switching instruction is received, where y is a natural number. Correspondingly, video frames to which the first packet and the second packet respectively belong are the first video frame and the second video frame. An out-of-synchronization degree of the first video stream and the second video stream usually does not exceed one frame. In other words, a difference between the time period of receiving the first packet and the time period of receiving the second packet usually does not exceed one frame duration. Therefore, the time period of receiving the first video frame generally overlaps the time period of receiving the second video frame.

In specific implementation, there are a plurality of specific manners for determining the first packet and the second packet, as shown in the following three examples.

In a first feasible manner, the first video frame is a video frame that is in the first video stream and that is received when the switching instruction is received. The second video frame is a video frame that is in the second video stream and that is received when the switching instruction is received.

Figure 5:
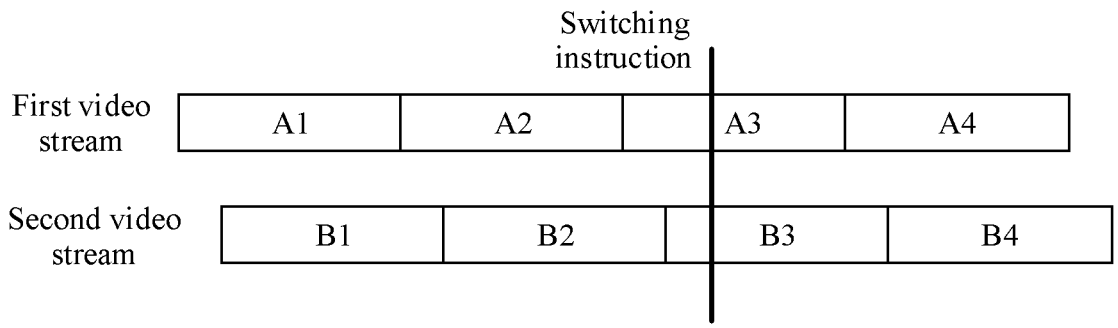
FIG. 5 is a schematic diagram of video frames included in two video streams according to an embodiment of this application.

For example, referring to a first video stream and a second video stream shown in FIG. 5, a first video frame is A3, and a second video frame is B3.

In other words, the first packet is a first frame trailer packet that is in the first video stream and that is received after the switching instruction is received. The first frame trailer packet in the first video stream is a frame trailer packet in a video frame that is in the first video stream and that is received when the switching instruction is received. The second packet is a first frame trailer packet that is in the second video stream and that is received after the switching instruction is received. The first frame trailer packet in the second video stream is a frame trailer packet in a video frame that is in the second video stream and that is received when the switching instruction is received.

In a second feasible manner, the first video frame is a previous video frame of a video frame that is in the first video stream and that is received when the switching instruction is received. The second video frame is a previous video frame of a video frame that is in the second video stream and that is received when the switching instruction is received.

For example, referring to a first video stream and a second video stream shown in FIG. 5, a first video frame is A2, and a second video frame is B2.

In other words, the first packet is a last frame trailer packet that is in the first video stream and that is received before the switching instruction is received. The last frame trailer packet that is in the first video stream and that is received before the switching instruction is a frame trailer packet in a previous video frame of a video frame that is in the first video stream and that is received when the switching instruction is received. The second packet is a last frame trailer packet that is in the second video stream and that is received before the switching instruction is received. The last frame trailer packet that is in the second video stream and that is received before the switching instruction is a frame trailer packet in a previous video frame of a video frame that is in the second video stream and that is received when the switching instruction is received.

In a third feasible manner, video frame durations of the two video streams are not predetermined, and are determined after the switching instruction is received. The first video frame may be a video frame that is in the first video stream and that is received when the video frame duration is determined. The second video frame may be a video frame that is in the second video stream and that is received when the video frame duration is determined. Certainly, if other audio and video information further needs to be calculated, for example, the other audio and video information is sampling rates of the audio streams, packet durations of the audio streams, and a quantity of packets included in the video frame, the first video frame may be a video frame that is in the first video stream and that is received when all to-be-determined audio and video information is determined. The second video frame may be a video frame that is in the second video stream and that is received when all to-be-determined parameters are determined.

In other words, the first packet is a first frame trailer packet that is in the first video stream and that is received after the audio and video information is determined. The first frame trailer packet in the first video stream is a frame trailer packet in a video frame that is in the first video stream and that is received when the audio and video information is determined. The second packet is a first frame trailer packet that is in the second video stream and that is received after the audio and video information is determined. The first frame trailer packet in the second video stream is a frame trailer packet in a video frame that is in the second video stream and that is received when the audio and video information is determined.

In an example, the following describes, as an example, that the synchronization relationship between the two video streams is determined based on the first packet in the first video frame and the second packet in the second video frame. For example, both the first packet and the second packet are frame trailer packets. The frame trailer packet (the first packet) selected in the first video stream is compared with the timestamp of the frame trailer packet (the second packet) selected in the second video stream to determine the synchronization relationship between the first video stream and the second video stream. Considering that a switched-in video stream and a switched-out video stream are unlikely to be totally synchronized, in this embodiment of this application, the synchronization relationship may be classified into three cases, basic synchronization, the switched-out video stream is later than the switched-in video stream, and the switched-out video stream is earlier than the switched-in video stream. Considering that different devices have precision deviations, timestamps TSs of video streams sent from different sending devices at a same moment may have deviations. In addition, the video streams are transmitted in packets, and jitter in packet forwarding may also introduce some synchronization deviations. Therefore, if a timestamp deviation between frame trailer packets in the two video streams is less than a first threshold, it is considered that the two video streams are synchronized. For ease of description, in subsequent description, the first threshold is referred to as a synchronization deviation. For example, the first threshold may be determined based on the video frame durations of the two video streams. In this embodiment of this application, the video frame durations of the two video streams are the same. For example, both are T.

The first threshold may be configured as T/4. The first threshold may also be determined based on clock synchronization precision of a video source end. For example, the first threshold may also be configured as a value such as T/5 or T/10 based on an actual situation.

In an example, the timestamp of the switching point of the first video stream and the timestamp of the switching point of the second video stream are determined in a plurality of manners. The following provides three feasible manners.

In a first feasible manner, if the first video stream and the second video stream are synchronized, the timestamp of the first packet in the first video stream may be used as the timestamp of the switching point of the first video stream, and the timestamp of the second packet in the second video stream may be used as the timestamp of the switching point of the second video stream. The manner may be applicable to the second feasible manner or the third feasible manner used in selecting the first video frame and the second video frame.

In a second feasible manner, if the first video stream and the second video stream are synchronized, a specific delay is added to each of the timestamp of the switching point of the first video stream, determined in the first feasible implementation, and the timestamp of switching point of the second video stream, determined in the first feasible implementation as timestamps of switching points. The manner may be applicable to the first feasible manner, the second feasible manner, or the third feasible manner used in determining the first packet and the second packet.

For example, if the first video stream and the second video stream are synchronized, $TS\_sw\_v1=FT\_TS1+N*T1$, and $TS\_sw\_v2=FT\_TS2+N*T2$, where T1 represents the video frame duration of the first video stream, T2 represents the video frame duration of the second video stream, $TS\_sw\_v1$ represents the timestamp of the switching point of the first video stream, $TS\_sw\_v2$ represents the timestamp of the switching point of the second video stream, $FT\_TS1$ represents the timestamp of the first packet, $FT\_TS2$ represents the timestamp of the second packet, and N is an integer greater than 0. In an example, the video frame duration of the first video stream may be the same as the video frame duration of the second video stream.

In a third feasible manner, if the first video stream and the second video stream are out-of-synchronization (namely, asynchronous), a specific delay (for example, out-of-synchronization duration) may be added to the first video stream and/or the second video stream as timestamps of the switching points. If the second video stream is earlier than the first video stream, the specific delay (for example, the out-of-synchronization duration) is added to the first video stream as the switching point. In this way, the first video stream is synchronized to the second video stream. In consideration of an out-of-order case, the specific delay may be added separately to the second video stream and the first video stream to which the specific delay is added as switching points. If the second video stream is later than the first video stream, the specific delay (for example, the out-of-synchronization duration) is added to the second video stream as the switching point. In this way, the second video stream is synchronized to the first video stream. In consideration of the out-of-order case, the specific delay may be added to the synchronized first video stream and the synchronized second video stream separately as the switching points. The manner may be applicable to the first feasible manner, the second feasible manner, or the third feasible manner used in selecting the first packet and the second packet.

In an example 1, if the first video stream is later than the second video stream, $TS\_sw\_v1=FT\_TS1+(N+1)*T1$, and $TS\_sw\_v2=FT\_TS2+N*T2$; or if the first video stream is earlier than the second video stream, $TS\_sw\_v1=FT\_TS1+N*T1$, and $TS\_sw\_v2=FT\_TS2+(N+1)*T2$.

In an example 2, if the first video stream is later than the second video stream, $TS\_sw\_v1=FT\_TS1+(N+K1)*T1$, and $TS\_sw\_v2=FT\_TS2+N*T2$, where $T1=T2=T$, and $K1=\lceil(FT_{TS2}-(FT_{TS1}+L*T))/T\rceil$, where $\lceil\ \rceil$ represents rounding up, $0 \leq L < 1$, and N is an integer greater than 0.

In an example, considering that the switched-in video stream and the switched-out video stream are unlikely to be totally synchronized, when timestamps of switching points of two asynchronous video streams are determined, a synchronization deviation may be considered. For example, L represents a synchronization deviation coefficient. For example, when $L=T/4$, and the first video stream is later than the second video stream, and a difference between the timestamp of the second packet and the timestamp of the first packet is greater than T/4 and less than 5T/4, $K1=1$.

If the first video stream is earlier than the second video stream, $TS\_sw\_v1=FT\_TS1+N*T1$, and $TS\_sw\_v2=FT\_TS2+(N+K2)*T2$, where $T1=T2=T$, and $K2=\lceil(FT_{TS1}-(FT_{TS2}+L*T))/T\rceil$.

For example, when $L=0$, if a difference between the timestamp of the first packet and the timestamp of the second packet is less than a video frame duration T, $K2=1$.

For example, the video parameter value includes the sequence number. That the switching device determines the video parameter value of the switching point of the first video stream based on the synchronization relationship and a video parameter value of the first packet, and determines the video parameter value of the switching point of the second video stream based on the synchronization relationship and a video parameter value of the second packet may be implemented in the following manner.

In one manner, the switching device determines the timestamp of the switching point of the first video stream based on the synchronization relationship, the timestamp of the first packet, and the video frame duration of the first video stream, and determines a sequence number of the switching point of the first video stream based on the timestamp of the switching point of the first video stream. The switching device determines the timestamp of the switching point of the second video stream based on the synchronization relationship, the timestamp of the second packet, and the video frame duration of the second video stream, and determines a sequence number of the switching point of the second video stream based on the timestamp of the switching point of the second video stream. For example, after the timestamps of the switching points are determined, sequence numbers of the switching points are determined based on the timestamps of the switching points, the sequence number of the first packet, and the quantity of packets included in the video frames. Specifically, relationships between the switching points and the first packet may be determined based on the timestamp of the first packet and the timestamp of the switching points. For example, if differences between the first packet and each of the switching points are one video frame, the quantity of packets included in the video frames is added to the sequence number of the first packet to obtain the sequence numbers of the switching points.

In another manner, the switching device determines a sequence number of the switching point of the first video stream based on the synchronization relationship, a sequence number of the first packet, and a quantity of packets in a video frame in the first video stream, and determines a sequence number of the switching point of the second video stream based on the synchronization relationship, a sequence number of the second packet, and a quantity of packets in a video frame in the second video stream.

For example, the quantity of packets in the video frame in the first video stream is determined based on a sequence number difference between received frame trailer packets in two adjacent video frames in the first video stream, and the quantity of packets in the video frame in the second video stream is determined based on a sequence number difference between received frame trailer packets in two adjacent video frames in the second video stream; or the quantity of packets in the video frame in the first video stream is determined based on a sequence number difference between received frame header packets in two adjacent video frames in the first video stream, and the quantity of packets in the video frame in the second video stream is determined based on a sequence number difference between received frame header packets in two adjacent video frames in the second video stream. When the quantity of packets in the video frame in the first video stream is equal to the quantity of packets in the video frame in the second video stream, only the quantity of packets in the video frame in the first video stream or only the quantity of packets in the video frame in the second video stream may be determined.

In an example, that the switching device determines the sequence number of the switching point of the first video stream based on the synchronization relationship, the sequence number of the first packet, and the quantity of packets in the video frame in the first video stream, and determines the sequence number of the switching point of the second video stream based on the synchronization relationship, the sequence number of the second packet, and the quantity of packets in the video frame in the second video stream may be implemented in a plurality of manners. The following provides three feasible manners.

In a first feasible manner, if the first video stream and the second video stream are synchronized, the sequence number of the first packet in the first video stream may be used as the sequence number of the switching point of the first video stream, and the sequence number of the second packet in the second video stream may be used as the sequence number of the switching point of the second video stream. The manner may be applicable to the second feasible manner or the third feasible manner used in selecting the first video frame and the second video frame.

In a second feasible manner, if the first video stream and the second video stream are synchronized, a specific quantity of packets is added to each of the sequence number of the switching point of the first video stream, determined in the first feasible implementation, and the sequence number of the switching point of the second video stream, determined in the first feasible implementation as sequence numbers of the switching points. The manner may be applicable to the first feasible manner, the second feasible manner, or the third feasible manner used in selecting the first packet and the second packet.

For example, if the first video stream and the second video stream are synchronized, $SN\_sw\_v1=FT\_SN1+N*M1$, and $SN\_sw\_v2=FT\_SN2+N*M2$, where M1 represents the quantity of packets included in the first video frame, M2 represents the quantity of packets included in the second video frame, $SN\_sw\_v1$ represents the sequence number of the switching point of the first video stream, $SN\_sw\_v2$ represents the sequence number of the switching point of the second video stream, $FT\_SN1$ represents the sequence number of the first packet, $FT\_SN2$ represents the sequence number of the second packet, and N is an integer greater than 0. For example, the quantity of packets included in the video frame in the first video stream is the same as the quantity of packets included in the video frame in the second video stream. In other words, M1=M2.

In a third feasible manner, if the first video stream and the second video stream are out-of-synchronization (namely, asynchronous), a specific quantity of packets may be added to the first video stream and/or the second video stream as the switching points. If the second video stream is earlier than the first video stream, the specific quantity of packets is added to the first video stream as the switching point. In this way, the first video stream is synchronized to the second video stream. In consideration of an out-of-order case, the specific quantity of packets may be added separately to the second video stream and the first video stream to which the specific quantity of packets is added as the switching points. If the second video stream is later than the first video stream, the specific quantity of packets is added to the second video stream as the switching point. In this way, the second video stream is synchronized to the first video stream. In consideration of an out-of-order case, the specific quantity of packets may be added separately to the synchronized first video stream and the synchronized second video stream as the switching points. The manner may be applicable to the first feasible manner, the second feasible manner, or the third feasible manner used in selecting the first video frame and the second video frame.

For example, the sequence number of the switching point of the first video stream and the sequence number of the switching point of the second video stream meet the following conditions.

In an example 1, if the first video stream is later than the second video stream, $SN\_sw\_v1=FT\_SN1+(N+1)*M1$, and $SN\_sw\_v2=FT\_SN2+N*M2$; or if the first video stream is earlier than the second video stream, $SN\_sw\_v1=FT\_SN1+N*M1$, and $SN\_sw\_v2=FT\_SN2+(N+1)*M2$.

In an example 2, if the first video stream is later than the second video stream, $SN\_sw\_v1=FT\_SN1+(N+K1)*M1$, and $SN\_sw\_v2=FT\_SN2+N*M2$; or if the first video stream is earlier than the second video stream, $SN\_sw\_v1=FT\_SN1+N*M1$, and $SN\_sw\_v2=FT\_SN2+(N+K2)*M2$, where $K1=\lceil(FT_{TS2}-(FT_{TS1}+L*T))/T\rceil$, and $K2=\lceil(FT_{TS1}-(FT_{TS2}+L*T))/T\rceil$, where $\lceil\ \rceil$ represents rounding up, T represents the video frame duration of the first video stream or the video frame duration of the second video stream, the video frame duration of the first video stream is the same as the video frame duration of the second video stream, $0 \leq L < 1$, $FT\_TS1$ represents the timestamp of the first packet, and $FT\_TS2$ represents the timestamp of the second packet.

In an example, when the switching device determines the audio parameter value of the switching point of the first audio stream based on the timestamp of the switching point of the first video stream, and determines the audio parameter value of the switching point of the second audio stream based on the timestamp of the switching point of the second video stream, the audio parameter value may be the timestamp. In other words, when switching points of the audio streams are determined, timestamps of the switching points of the audio streams are determined based on the timestamps of the switching points of the video streams. Specifically, that the switching device determines a timestamp of the switching point of the first audio stream based on the timestamp of the switching point of the first video stream, and determines a timestamp of the switching point of the second audio stream based on the timestamp of the switching point of the second video stream may be implemented in the following manners.

The switching device determines the timestamp of the switching point of the first audio stream based on the timestamp of the switching point of the first video stream, the video frame duration of the first video stream, a clock frequency of the first video stream, and a sampling rate of the first audio stream. The switching device determines the timestamp of the switching point of the second audio stream based on the timestamp of the switching point of the second video stream, the video frame duration of the second video stream, a clock frequency of the second video stream, and a sampling rate of the second audio stream.

For example, the timestamp of the switching point of the first audio stream and the timestamp of the switching point of the second audio stream meet the following conditions, $TS\_sw\_a1=(TS\_sw\_v1+T-TS\_ref\_v)*frequency\_a1/frequency\_v1+TS\_ref\_a$; and $TS\_sw\_a2=(TS\_sw\_v2+T-TS\_ref\_v)*frequency\_a1/frequency\_v1+TS\_ref\_a$, where $TS\_sw\_a1$ represents the timestamp of the switching point of the first audio stream, $TS\_sw\_v1$ represents the timestamp of the switching point of the first video stream, $TS\_sw\_a2$ represents the timestamp of the switching point of the second audio stream, $TS\_sw\_v2$ represents the timestamp of the switching point of the second video stream, T represents the video frame duration of the first video stream or the video frame duration of the second video stream, where the video frame duration of the first video stream and the video frame duration of the second video stream are the same, $TS\_ref\_v$ represents a reference timestamp of a video stream, determined by using first time as a reference, $TS\_ref\_a$ represents a reference timestamp of an audio stream, determined by using the first time as a reference, where the first time is any historical time on the switching device, and frequency_a1 is the sampling rate of the first audio stream, frequency_a2 is the sampling rate of the second audio stream, frequency_v1 is the clock frequency of the first video stream, and frequency_v2 is the clock frequency of the second video stream. In an example, in this embodiment of this application, the clock frequency of the first video stream may be the same as or approximately equal to the clock frequency of the second video stream, and the sampling rate of the first audio stream may be the same as or approximately equal to the sampling rate of the second audio stream.

Any historical time on the switching device indicates a quantity of seconds from a historical moment to epoch time specified by the SMPTE. For example, any historical time on the switching device may be current time of the device when the timestamps of the switching points are determined, or anytime experienced by the device before the timestamps of the switching points are determined.

For example, when the reference timestamp of the audio stream and the reference timestamp of the video stream are determined, the current time of the device when the timestamps of the switching points are determined is used as the first time. In other words, the current time of the device when the timestamps of the switching points are determined may be used as the first time to determine the reference timestamp of the audio stream and the reference timestamp of the video stream.

For example, the current time (curtime) of the device is obtained, and the reference timestamp $TS\_ref\_v$ of the video stream and the reference timestamp $TS\_ref\_a$ of the audio stream are calculated based on the curtime, $TS\_ref\_v=$ (curtime*frequency_v) mod ($2^{32}$), and $TS\_ref\_a=$ (curtime*frequency_a) mod ($2^{32}$), where the current time of the device may be a quantity of seconds from current time to epoch time specified by the SMPTE, and 32 represents a quantity of bits occupied by the timestamp, certainly, the quantity of bits may be another value, and 32 is merely an example.

In addition, when sampling rates of the audio streams are unknown, timestamp differences between two adjacent packets in the audio streams may be learned to estimate the sampling rates. The sampling rates of the first audio stream are determined based on timestamps and sequence numbers of any two received packets in the first audio stream, or the sampling rates of the second audio stream are determined based on timestamps and sequence numbers of any two received packets in the second audio stream. Certainly, when the sampling rate of the first audio stream is the same as the sampling rate of the second audio stream, only one of the sampling rate of the first audio stream and the sampling rate of the first audio stream may be determined.

In addition, to improve accuracy of determining the timestamp differences between the two packets, an average value of timestamp differences between a plurality of groups of adjacent packets may be estimated to estimate the sampling rates.

Table 1 shows, for example, three sampling rates 44.1 kHz, 48 kHz, and 96 kHz specified in the SMPTE 2110, and a theoretical value of a timestamp difference between two packets whose packet duration is 125 us and 1 ms and whose sequence numbers are adjacent.

TABLE 1

| Number 1 | Sampling rate $f_{sample}$ | Packet duration $t_{packet}$ | Theoretical value $avgTS_{theory}$ of a timestamp difference between two packets whose sequence numbers are adjacent |
|---|---|---|---|
| 1 | 44.1 kHz | 125 μs | 5.5 |
| 2 | 48 kHz | 125 μs | 6 |
| 3 | 96 kHz | 125 μs | 12 |
| 4 | 44.1 kHz | 1 ms | 44.1 |
| 5 | 48 kHz | 1 ms | 48 |
| 6 | 96 kHz | 1 ms | 96 |

The timestamp difference avgTS between the two adjacent packets may be calculated by using a timestamp difference T between any two packets and a sequence number difference M between the two packets, avgTS=T/M.

When the timestamp difference avgTS between the two adjacent packets is used to estimate the sampling rate, the following manner may be used for implementation.

If avgTS<A, frequency_a=44.1 kHz. For example, a value of A may be a number less than or equal to 6 and greater than 5.5. For example, the value of A is 6.

If avgTS≥A and avgTS<B, frequency_a=48 kHz. For example, a value of B may be a number less than 12 and greater than 6. For example, the value of B is 9.

If avgTS≥B and avgTS<C, frequency_a=96 kHz. For example, a value of C may be a number less than 44 and greater than 12. For example, the value of C is 15.

If avgTS≥D and avgTS<E, frequency_a=44.1 kHz. For example, a value of D may be a number greater than or equal to C and less than 44.1. For example, the value of D is 40. A value of E may be a number less than or equal to 48 and greater than 44.1. For example, the value of E is 46.

If avgTS≥E and avgTS<F, frequency_a=48 kHz. For example, a value of F may be a number less than or equal to 96 and greater than 48. For example, the value of F is 50.

If avgTS≥F and avgTS<G, frequency_a=96 kHz. For example, a value of G may be a number greater than 96. For example, the value of G is 120.

In addition, when the avgTS does not meet any one of the foregoing conditions, the sampling rates may be preset sampling rates by default. The preset sampling rate is one of the foregoing 44.1 kHz, 48 kHz, and 96 kHz, for example, 48 kHz.

In a possible example, when the audio streams are switched and used audio parameter values include the sequence numbers, sequence numbers of the switching points of the audio streams may be determined based on the timestamps of the switching points of the audio streams. Specifically, the switching device determines the timestamp of the switching point of the first audio stream based on the timestamp of the switching point of the first video stream, and determines the sequence number of the switching point of the first audio stream based on the timestamp of the switching point of the first audio stream; and determines the timestamp of the switching point of the second audio stream based on the timestamp of the switching point of the second video stream, and determines the sequence number of the switching point of the second audio stream based on the timestamp of the switching point of the second audio stream.

For example, the sequence number of the switching point of the first audio stream and the sequence number of the switching point of the second audio stream meet the following conditions, SN_sw_a1=SN1+(TS_sw_a1−TS1)/AvgTS1; and SN_sw_a2=SN2+(TS_sw_a2−TS2)/AvgTS2 where AvgTS1=packetTime1*frequency_a1, AvgTS2=packetTime2*frequency_a2, where packetTime1 is a packet duration of the first audio stream, packetTime2 is a packet duration of the second audio stream, frequency_a1 represents the sampling rate of the first audio stream, frequency_a2 represents the sampling rate of the second audio stream, and TS_sw_a1 represents the timestamp of the switching point of the first audio stream, TS_sw_a2 represents the timestamp of the switching point of the second audio stream, SN_sw_a1 represents the sequence number of the switching point of the first audio stream, SN_sw_a2 represents the sequence number of the switching point of the second audio stream, SN1 represents a sequence number of a third packet in the first audio stream, TS1 represents a timestamp of the third packet, SN2 represents a sequence number of a fourth packet in the second audio stream, and TS2 represents a timestamp of the fourth packet, where the third packet is any received packet in the first audio stream, and the fourth packet is any received packet in the second audio stream.

For example, a packet duration of the audio stream may be determined based on the timestamp difference between the adjacent packets. In an example 1, it can be learned from Table 1 that theoretical value differences between timestamp differences of two packets corresponding to each of 125 µs and 1 ms are relatively obvious. Therefore, a threshold $dTS_{thres}$ may be set. The packet time may be determined as 125 µs or 1 ms based on a result obtained by comparing the actually calculated received packet timestamp difference avgTS with $dTS_{thres}$. For example, when avgTS<$dTS_{thres}$, the packet duration of the audio stream is a first value, for example $t_{packet}$=125 us. When avgTS≥$dTS_{thres}$, the packet duration of the audio stream is a second value, for example, $t_{packet}$=1 ms. For example, a number greater than 12 and less than 44.1 may be selected to be a value of $dTS_{thres}$. To determine the packet duration relatively good, a value between 12 and 44.1, for example, 25 may be selected. In an example 2, when the sampling rate of the audio stream is determined, the packet duration is determined based on the determined sampling rate. For example, when the determined sampling rate is 5.5, 6, or 12, the packet duration is 125 µs. When the determined sampling rate is 44.1, 48, or 96, the packet duration is 1 ms.

In addition, in this embodiment of this application, the packet durations of the audio streams and/or the sampling rates of the audio streams may be preconfigured for the switching device, or may be predetermined by the switching device based on a received packet. The packet that is in the audio stream and that is used to determine the packet durations and/or the sampling rates may be received before the switching instruction is received, or may be received after the switching instruction is received. For ease of description, the packet durations of the audio streams and/or the sampling rates of the audio stream are collectively referred to as audio stream information subsequently. The following uses two possible examples for description. For example, packets used to determine the packet durations and/or the sampling rates are two packets. The packet duration and the sampling rate of the first audio stream are equal to those of the second audio stream. Therefore, packets in either of the first audio stream or the second audio stream are selected to determine the packet durations and/or the sampling rates of the audio streams. In subsequent description, that two packets in the first audio stream are used to determine the packet durations and the sampling rates is used as an example.

In an example 1, the two packets may be first two packets that are in the first audio stream and that are received after the switching instruction is received.

In an example 2, the two packets may be two packets that are in the first audio stream and that are received before the switching instruction is received.

In addition, in this embodiment of this application, video frame durations of the video streams and the quantity of packets included in the video frames may be preconfigured for the switching device, or may be determined by the switching device based on two received adjacent frame trailer packets in the video stream or two received adjacent frame header packets in the video streams. For ease of description, video frame durations of the video streams and the quantity of packets included in the video frames are collectively referred to as video stream information subsequently. In one manner, the video frame duration of the first video stream may be determined based on a timestamp difference between received frame trailer packets in two adjacent video frames in the first video stream. The video frame duration of the second video stream is determined based on a timestamp difference between received frame trailer packets in two adjacent video frames in the second video stream. In other words, the video frame duration of the first video stream may be determined based on the timestamp difference between two received adjacent frame trailer packets in the first video stream. The video frame duration of the second video stream may be determined based on the timestamp difference between two received adjacent frame trailer packets in the second video stream. The quantity of packets included in the video frame in the first video stream may be determined based on a sequence number difference between received frame trailer packets in two adjacent video frames in the first video stream. The quantity of packets included in the video frame in the second video stream is determined based on a sequence number difference between received frame trailer packets in two adjacent video frames in the second video stream. In other words, the quantity of packets included in the video frame in the first video stream may be determined based on the sequence number difference between two received adjacent frame trailer packets in the first video stream. The quantity of packets included in the video frame in the second video stream is determined based on the sequence number difference between two received adjacent frame trailer packets in the second video stream.

In another manner, the video frame duration of the first video stream is determined based on a timestamp difference between received frame header packets in two adjacent video frames in the first video stream. The video frame duration of the second video stream is determined based on a timestamp difference between received frame header packets in two adjacent video frames in the second video stream. The quantity of packets included in the video frame in the first video stream may be determined based on a sequence number difference between received frame header packets in two adjacent video frames in the first video stream. The quantity of packets included in the video frame in the second video stream is determined based on a sequence number difference between received frame header packets in two adjacent video frames in the second video stream.

In an example, when the video frame duration of the first video stream and the quantity of packets included in the video frame in the first video stream are the same as the video frame duration of the second video stream and the quantity of packets included in the video frame in the second video stream, and the video frame duration and the quantity of packets included in the video frame are determined, one of the first video stream and the second video stream may be selected to determine the video frame durations of the video streams.

In an example 3, the two adjacent video frames in the first video stream are two video frames in the first video stream that are received before the switching instruction is received. The two adjacent video frames in the second video stream are two video frames in the second video stream that are received before the switching instruction is received. In other words, the video frame durations of the video streams and the quantity of packets included in the video frames in the video streams are calculated before the switching instruction is received.

In an example 4, the two adjacent video frames in the first video stream are a video frame in which a packet that is in the first video stream and that is received when the switching instruction is received is located and a next video frame of the video frame. The two adjacent video frames in the second video stream are a video frame in which a packet that is in the second video stream and that is received when the switching instruction is received is located and a next video of the video frame. In other words, the video frame durations of the video streams and the quantity of packets included in the video frames in the video streams are started to be calculated when the switching instruction is received.

In this embodiment of this application, in a first scenario, the audio stream information is preconfigured for the switching device, and the video stream information is also preconfigured for the switching device. The first packet and the second packet may be determined by using the first feasible manner or the second feasible manner. Specifically, for example, both the first packet and the second packet are the frame trailer packets. The first packet may be the first frame trailer packet that is in the first video stream and that is received after the switching instruction is received, and the second packet is the first frame trailer packet that is in the second video stream and that is received after the switching instruction is received. Alternatively, the first packet is the last frame trailer packet that is in the first video stream and that is received before the switching instruction is received, and the second packet is the last frame trailer packet that is in the second video stream and that is received before the switching instruction is received.

In a second scenario, the audio stream information is preconfigured for the switching device, but the video stream information is not preconfigured for the switching device. When the two adjacent video frames described in the example 3 are used to determine the video stream information, the first feasible manner or the second feasible manner may be used to determine the first packet and the second packet. When the two adjacent video frames described in the example 4 are used to determine the video stream information, the third feasible manner may be used to select the first packet and the second packet. Specifically, the first packet may be a first frame trailer packet that is in the first video stream and that is received after the video stream information is determined, and the second packet may be a first frame trailer packet that is in the second video stream and that is received after the video stream information is determined. Alternatively, the first packet may be a last frame trailer packet that is in the first video stream and that is received before the video stream information is determined, and the second packet may be a last frame trailer packet that is in the second video stream and that is received before the video stream information is determined.

In a third scenario, the video stream information is preconfigured for the switching device, but the audio stream information is not preconfigured for the switching device. When the two packets described in the example 2 are used to determine the audio stream information, the first feasible manner or the second feasible manner may be used to select the first packet and the second packet. When the two packets described in the example 1 are used to determine the audio stream information, the third feasible manner may be used to determine the first packet and the second packet. Specifically, the first packet may be a first frame trailer packet that is in the first video stream that is received after the audio stream information is determined, and the second packet may be a first frame trailer packet that is in the second video stream and that is received after the audio stream information is determined. Alternatively, the first packet may be a last frame trailer packet that is in the first video stream and that is received before the audio stream information is determined, and the second packet may be a last frame trailer packet that is in the second video stream and that is received before the audio stream information is determined.

In a fourth scenario, the video stream information is not preconfigured for the switching device, or the audio stream information is not preconfigured for the switching device. When the two packets described in the example 2 are used to determine the audio stream information, and the two adjacent video frames described in the example 3 are used to determine the video stream information, the first feasible manner or the second feasible manner may be used to select the first packet and the second packet. In the fourth scenario, when other examples, for example, the example 2 and the example 4, the example 1 and the example 3, or the example 1 and the example 4 are used, the third feasible manner may be used to determine the first packet and the second packet. For example, the example 1 and the example 4 are used. The first packet may be a first frame trailer packet that is in the first video stream and that is received after the audio stream information and the video stream information are determined, and the second packet may be a first frame trailer packet that is in the second video stream and that is received after the audio stream information and the video stream information are determined.

The following uses an example in which the video streams are switched based on the timestamps of the video streams and the sequence numbers of the video streams. That the switching device switches packets that are in the first video stream and whose video parameter values are greater than the video parameter value of the switching point of the first video stream to packets that are in the second video stream and whose video parameter values are greater than the video parameter values of the switching point of the second video stream is specifically implemented in the following manners.

For the switched-out video stream (the first video stream).

1. Obtain an RTP timestamp RTP.TS1 of a current packet and an RTP sequence number RTP.SN1 of the current packet when the packet in the first video stream arrives.

2. Compare the RTP.TS1 of the current packet with the timestamp SW_TS1 of the switching point of the first video stream, and calculate a difference diff_TS 1=|RTP. TS1− SW_TS 1| between the RTP.TS1 and the SW_TS1.

3. If the diff_T1 is greater than a threshold threshold_TS1, it indicates that the current packet is far away from the switching point. If the RTP.TS1 is less than or equal to the SW_TS1, it indicates that the current packet is a packet before the switching point and therefore is forwarded. If the RTP.TS1 is greater than the SW_TS1, it indicates that the current packet is a packet after the switching point and therefore is discarded. The threshold threshold_TS1 is greater than or equal to 0 and is less than the video frame duration.

4. If the diff_TS1 is less than or equal to the threshold threshold_TS1, it indicates that the current packet is near the switching point, and the RTP.S1 of the current packet is continuously compared with the SW_SN1 of the switching point. If the RTP.SN1 is greater than the SW_SN1, it indicates that the current packet is a packet after the switching point and therefore is discarded. If the RTP.SN1 is less than or equal to the SW_SN1, it indicates that the current packet is a packet before the switching point and therefore is forwarded.

It should be noted that the threshold threshold_TS1 may be determined based on a timestamp error that can be tolerated by the switching device. For example, if a timestamp difference between two adjacent video frames is fixed at T (namely, the video frame duration), the threshold threshold_TS1 may be set to 0. For another example, not all timestamp differences between two adjacent video frames are T, and a deviation may exist. For example, when a deviation that can be tolerated by the switching device is T/4, the threshold threshold_TS1 may be set to T/4.

For the switched-in video stream (the second video stream).

1. Obtain an RTP timestamp RTP.TS2 of a current packet and an RTP sequence number RTP.SN2 of the current packet when the packet in the second video stream arrives.

2. Compare the RTP.TS2 of the current packet with the timestamp SW_TS2 of the switching point of the second video stream, and calculate a difference diff_TS2=|RTP.TS 2−SW_TS2| between the RTP.TS2 and the SW_TS2.

3. If the diff_TS2 is greater than a threshold threshold_TS1, it indicates that the current packet is far away from the switching point. If the RTP.TS2 is less than or equal to the SW_TS2, it indicates that the current packet is a packet before the switching point and therefore is discarded. If the RTP.TS2 is greater than the SW_TS2, it indicates that the current packet is a packet after the switching point and therefore is forwarded.

4. If the diff_TS2 is less than or equal to the threshold threshold_TS1, it indicates that the current packet is near the switching point, and the RTP. S2 of the current packet is continuously compared with the SW_SN2 of the switching point. If the RTP.SN2 is greater than the SW_SN2, it indicates that the current packet is a packet after the switching point and therefore is forwarded. If the RTP.SN2 is less than or equal to the SW_SN2, it indicates that the current packet is a packet before the switching point and therefore is discarded.

In a possible implementation, when the video streams are switched, the timestamp error that can be tolerated by the switching device may be used to determine to switch the video streams based on a timestamp, a sequence number, or a timestamp and a sequence number. For example, a timestamp difference between two adjacent video frames in a same video stream is fixed at T (namely, the video frame duration). In this case, the video streams may be switched based on the timestamp. Specifically, a timestamp of a packet is compared with a timestamp of a switching point. For the switched-in video stream, if the timestamp of the packet is greater than the timestamp of the switching point, the packet is forwarded. If the timestamp of the packet is less than or equal to the timestamp of the switching point, the packet is discarded. In this case, the video streams may be switched based on the sequence number. Specifically, sequence numbers of the packets are compared with a sequence number of the switching point. For the switched-in video stream, if the sequence numbers of the packets are greater than the sequence number of the switching point, the packets are forwarded, and if the sequence numbers of the packets are less than or equal to the sequence number of the switching point, the packets are discarded. For another example, not all timestamp differences between two adjacent video frames are T, and a deviation may exist. The video streams may be switched based on the sequence number, or the video streams may be switched based on the timestamp and the sequence number. A specific manner of switching the video streams based on the timestamp and the sequence number is described above, and details are not described herein again.

The following uses an example in which the audio streams are switched based on the timestamp of the audio streams. That the switching device switches packets that are in the first audio stream and whose audio parameter values are greater than the audio parameter value of the switching point of the first audio stream to packets that are in the second audio stream and whose audio parameter values are greater than the audio parameter value of the switching point of the second audio stream is specifically implemented in the following manners.

1. Obtain an RTP timestamp RTP.TS3 of a current packet and an RTP sequence number RTP.SN3 of the current packet when the packet in the first audio stream arrives.

2. Compare the RTP.TS3 of the current packet with the timestamp SW_TS3 of the switching point of the first audio stream, and calculate a difference diff_TS 3=|RTP. TS3− SW_TS 3| between the RTP.TS3 and the SW_TS3.

3. If the diff_T3 is greater than a threshold threshold_TS2, it indicates that the current packet is far away from the switching point. If the RTP.TS3 is less than or equal to the SW_TS3, it indicates that the current packet is a packet before the switching point and therefore is forwarded. If the RTP.TS3 is greater than the SW_TS3, it indicates that the current packet is a packet after the switching point and therefore is discarded. The threshold threshold_TS2 is greater than or equal to 0 and is less than the packet duration.

4. If the diff_TS3 is less than or equal to the threshold_TS2 and the RTP.TS3 is less than or equal to the SW_TS3, it indicates that the current packet is a packet after the switching point and therefore is discarded. If the RTP.TS3 is greater than the SW_TS3, it indicates that the current packet is a packet before the switching point and therefore is forwarded.

For the switched-in audio stream (the second audio stream).

1. Obtain an RTP timestamp RTP.TS4 of a current packet and an RTP sequence number RTP.SN4 of the current packet when the packet in the second audio stream arrives.

2. Compare the RTP.TS4 of the current packet with the timestamp SW_TS4 of the switching point of the second audio stream, and calculate a difference diff_TS4=|RTP.TS4−SW_TS4| between the RTP.TS4 and the SW_TS4.

3. If the diff_TS4 is greater than a threshold threshold_TS2, it indicates that the current packet is far away from the switching point. If the RTP.TS4 is less than or equal to the SW_TS4, it indicates that the current packet is a packet before the switching point and therefore is forwarded. If the RTP.TS4 is greater than the SW_TS4, it indicates that the current packet is a packet after the switching point and therefore is discarded.

4. If the diff_TS4 is less than or equal to the threshold threshold_TS2 and the RTP.TS4 is less than or equal to the SW_TS4, it indicates that the current packet is a packet after the switching point and therefore is forwarded. If the RTP.TS4 is greater than the SW_TS4, it indicates that the current packet is a packet before the switching point and therefore is discarded.

The following describes the embodiment of this application in detail with reference to a specific application scenario.

Herein an example in which two to-be-switched audio streams and two to-be-switched video streams both comply with the SMPTE 2110 standard, and packets included in the audio streams and the video streams are RTP packets is used.

Figure 6:
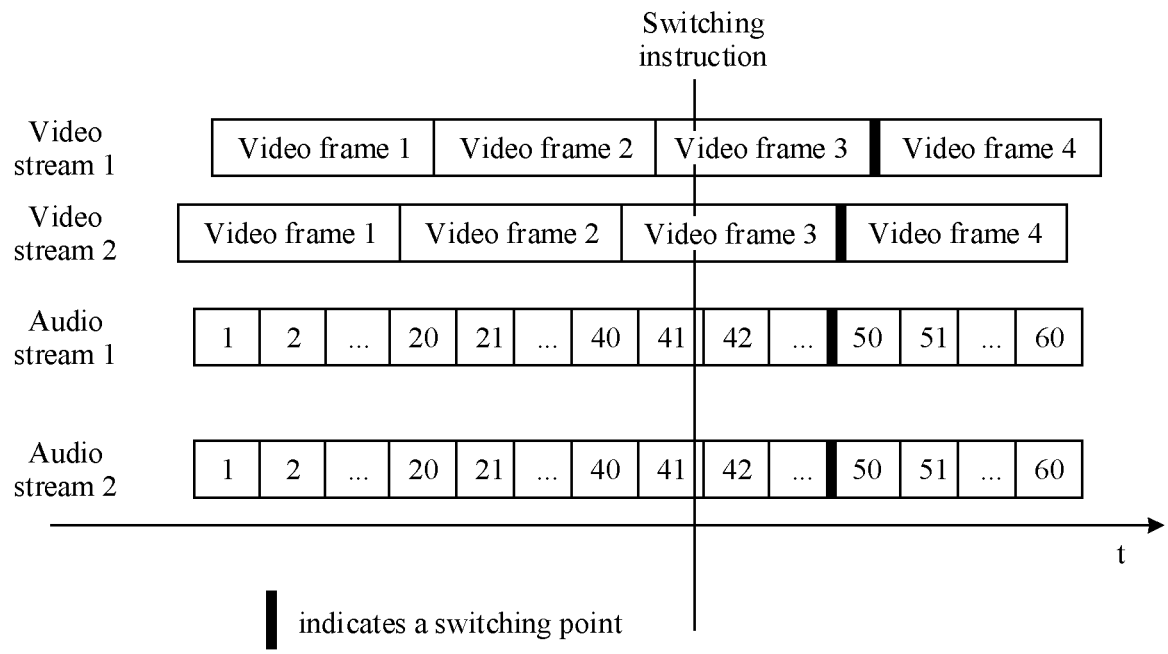
FIG. 6 is a schematic diagram of a to-be-switched video stream 1, a to-be-switched video stream 2, a to-be-switched audio stream 1, and a to-be-switched audio stream 2 according to an embodiment of this application.

First, an example in which the two audio streams are switched and the two video streams are switched is used. FIG. 6 shows two to-be-switched audio streams and two to-be-switched video streams. In FIG. 6, an audio stream 1 is a switched-out audio stream. An audio stream 2 is a switched-in audio stream. A video stream 1 is a switched-out video stream. A video stream 2 is a switched-in video stream.

In this embodiment of this application, a switching sub-table is established separately for the two to-be-switched audio streams and the two to-be-switched video streams to record switching states of the two to-be-switched audio streams and the two to-be-switched video streams, latest packet information, and the like. Therefore, a switching sub-table corresponding to the two video streams is used to determine the first packet used to determine the parameter value of the switching point of the first video stream and the second packet used to determine the parameter value of the switching point of the second video stream. For ease of description, the audio stream and the video stream are collectively referred to as a media stream in the following.

Referring to Table 2, a switching sub-table is used as an example.

TABLE 2

| | |
|---|---|
| Output port | 6 |
| Stream number | 0 |
| Stream state | Switched-in stream |
| Stream type | Video stream |
| Timestamp difference of packets | T |
| Sequence number difference of packets | M |
| Timestamp of a packet | TS0 |
| Sequence number of a packet | SN0 |
| Timestamp of a switching point | swTS0 |
| Sequence number of a switching point | swSN0 |

Fields included in the switching sub-table are described as follows.

The output port. The output port indicates a port through which the media stream is output from the switching device. It should be understood that clean switching of media streams that are output from a same port can be implemented.

The stream state. The stream state indicates a current state of the media stream. The current state of the media stream can be a normally forwarded stream, a normally discarded stream, a switched-in stream, or a switched-out stream.

The stream type. The stream type indicates a media stream type, and includes a video stream and an audio stream.

The timestamp difference of packets. When the stream type is the video stream, the timestamp difference of packets is used to record an RTP timestamp difference between frame trailer packets in two adjacent video frames in the video stream. When the stream type is the audio stream, the timestamp difference of packets is used to record an RTP timestamp difference between two adjacent packets in the audio stream.

The sequence number difference of packets. When the stream type is the video stream, the sequence number difference of packets is used to record an RTP sequence number difference between frame trailer packets in two adjacent video frames in the video stream. When the stream type is the audio stream, the sequence number difference of packets is used to record an RTP sequence number difference between two adjacent packets in the audio stream.

The timestamp of the packet. When the stream type is the video stream, the timestamp of the packet is used to record an RTP timestamp of a frame trailer packet in the video stream. When the stream type is the audio stream, the timestamp of the packet is used to record an RTP timestamp of a packet in the audio stream.

The sequence number of the packet. When the stream type is the video stream, the sequence number of the packet is used to record an RTP sequence number of a frame trailer packet in the video stream. When the stream type is the audio stream, the sequence number of the packet is used to record an RTP sequence number of a packet in the audio stream.

The timestamp of the switching point. The timestamp of the switching point indicates a timestamp of an RTP packet at a determined switching point.

The sequence number of the switching point. The sequence number of the switching point indicates a sequence number of an RTP packet at a determined switching point.

In addition, in this embodiment of this application, an audio switching summary table and a video switching summary table may be further established to implement audio and video synchronous switching. A switching summary table is used to record information that is about switching preparation of the media stream and that is used for the switching.

Referring to Table 3, a switching summary table is used as an example.

TABLE 3

| Timestamp of the latest packet in a switched-in stream | Timestamp of the latest packet in a switched-out video stream | Bitmap of a switched-in stream | Bitmap of a switched-out video stream | Timestamp of a switching point of a switched-in stream | Timestamp of a switching point of a switched-out video stream | Switching point calculation completion flag |
|---|---|---|---|---|---|---|
| TS0 | SN0 | 0000 | 0000 | swTSi | swTSo | 0 |

Fields included in the switching summary table are described as follows.

The timestamp of the latest packet in the switched-in stream. The timestamp of the latest packet in the switched-in stream is equal to a timestamp of the latest packet recorded in a switching sub-table of all switched-in video streams.

The timestamp of the latest packet in the switched-out video stream. The timestamp of the latest packet in the switched-out video stream is equal to a timestamp of the latest packet recorded in a switching sub-table of all switched-out video streams.

The bitmap of the switched-in stream. The bitmap of a switched-in stream is bitmap information about a switched-in media stream ready for switching. If there are four switched-in media streams (two video streams and two audio streams), a bitmap may be four bits. Each bit represents one piece of media stream information. "1" represents that a corresponding media stream is ready for switching, and "0" represents that a corresponding media stream is not ready for switching.

The bitmap of the switched-out video stream. The bitmap of the switched-out video stream is bitmap information about a switched-out media stream ready for switching. If there are four switched-out media streams, a bitmap may be four bits. Each bit represents one piece of media stream information. "1" represents that a corresponding media stream is ready for switching, and "0" represents that a corresponding media stream is not ready for switching.

The timestamp of the switching point of the switched-in stream. The timestamp of the switching point of the switched-in stream indicates a timestamp of a switching point of a switched-in video stream.

The timestamp of the switching point of the switched-out video stream. The timestamp of the switching point of the switched-out video stream indicates a timestamp of a switching point of a switched-out video stream.

The switching point calculation completion flag. The switching point calculation completion flag indicates whether switching point calculation is completed for a following media stream.

Figure 7:
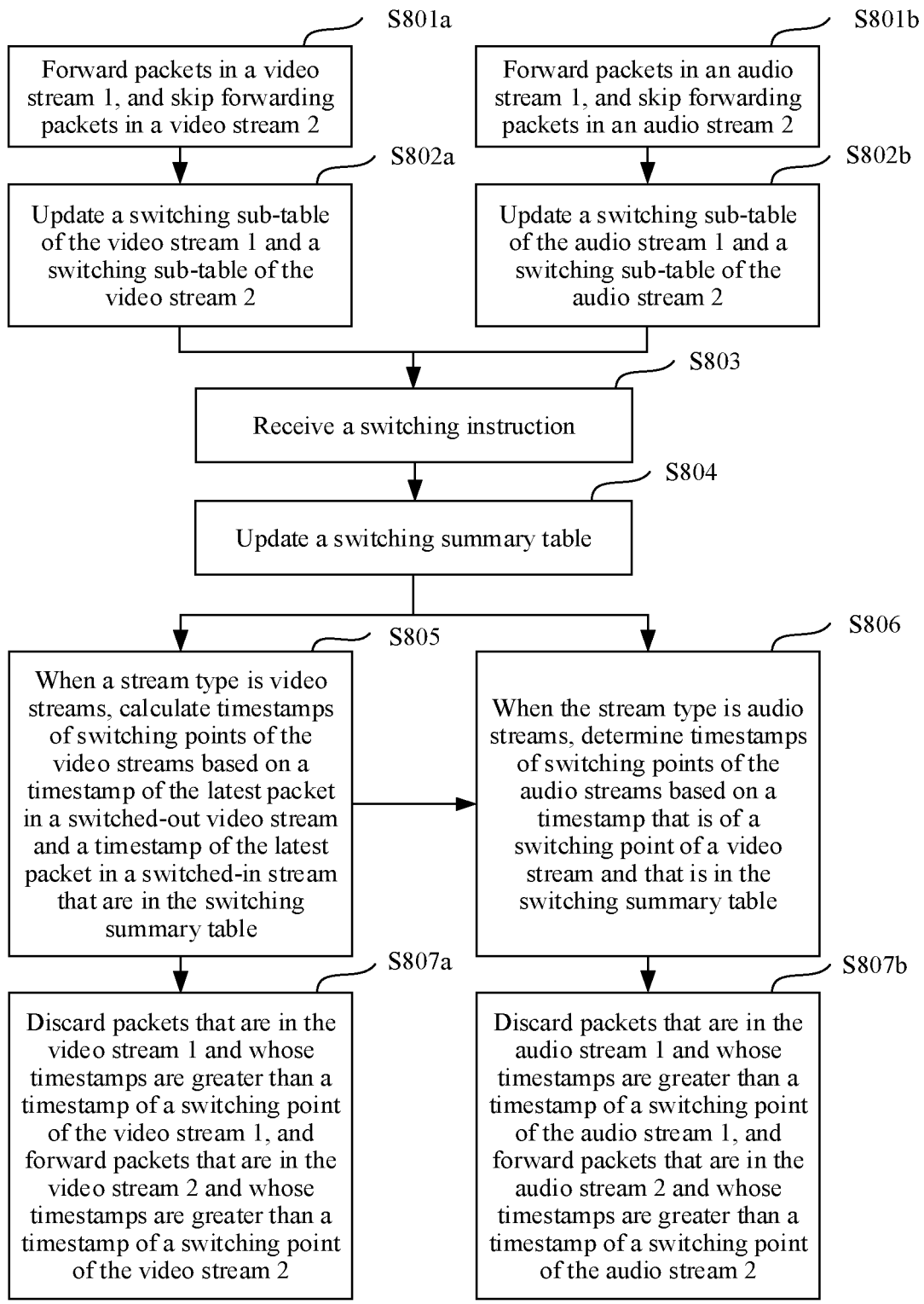
FIG. 7 is a schematic diagram of an audio stream and video stream synchronous switching procedure according to an embodiment of this application.

FIG. 7 is a schematic diagram of an example of an audio stream and video stream synchronous switching procedure. In FIG. 7, an example in which audio stream information of two audio streams and video stream information of two video streams are learned of in advance before a switching instruction is received is used.

Before the switching instruction is received, all media streams are forwarded normally or discarded normally. Currently, there are four media streams, a video stream 1 whose stream number is 1, whose stream type is a video stream, and whose stream state is a normally forwarded stream, an audio stream 1 whose stream number is 2, whose stream type is an audio stream, and whose stream state is a normally forwarded stream, a video stream 2 whose stream number is 1, whose stream type is a video stream, and whose stream state is a normally discarded stream, and an audio stream 2 whose stream number is 2, whose stream type is an audio stream, and whose stream state is a normally discarded stream.

S801a. Forward packets in the video stream 1, and skip forwarding packets in the video stream 2.

S801b. Forward packets in the audio stream 1, and skip forwarding packets in the audio stream 2.

S802a. Update a switching sub-table of the video stream 1 and a switching sub-table of the video stream 2.

S802b. Update a switching sub-table of the audio stream 1 and a switching sub-table of the audio stream 2.

Specifically, "timestamp of a packet" and "sequence number of a packet" in switching sub-tables are updated based on packets in the received media streams. Fields "timestamp of a packet" and "sequence number of a packet" in a switching sub-table in each of the video stream 1 and the video stream 2 are updated based on an RTP timestamp and an RTP sequence number of each received frame trailer packet in the video stream 1 and the video stream. Fields "timestamp of a packet" and "sequence number of a packet" in a switching sub-table in each of the audio stream 1 and the audio stream 2 are updated based on an RTP timestamp and an RTP sequence number of each received packet in the audio stream 1 and the audio stream 2.

S803. Receive the switching instruction, where the switching instruction is used to instruct to switch the audio stream 1 to the audio stream 2 and switch the video stream 1 to the video stream 2.

Specifically, a "stream state" in each switching sub-table is modified to a switched-out video stream or a switched-in stream, and a total quantity pairs of media streams that are synchronously switched in the switching is recorded. For example, after the switching instruction is received, stream states in switching sub-tables corresponding to each of the video stream 1 and the audio stream 1 are modified to be the switched-out video stream, stream states in switching sub-tables corresponding to each of the video stream 2 and the audio stream 2 are modified to be the switched-in stream, and a total quantity pairs of media streams that are synchronously switched in the switching is recorded as 2.

S804. Update a switching summary table.

Specifically, a bitmap of a switched-out video stream, a bitmap of a switched-in stream, a timestamp of the latest packet in a switched-in stream, and a timestamp of the latest packet in the switched-out video stream that are in the switching summary table are updated. Specific update rules are as follows.

(1) Update the switching summary table only when stream states in the switching sub-tables of each media stream are the switched-out video stream or the switched-in stream, and switching points of the media streams are not calculated totally.

(2) Update the bitmap of the switched-in stream and the bitmap of the switched-out video stream that are in the switching summary table. For example, a stream state in a switching sub-table of the video stream 1 is the switched-out video stream. A first bit of a bitmap of a switched-out video stream is found based on a stream number 1. When a value of the first bit of the bitmap of the switched-out video stream is 0, the first bit of the bitmap of the switched-out video stream is set as 1. In this case, the bitmap of the switched-out video stream is 0001. A stream state of the audio stream 1 is the switched-out video stream. A second bit of a bitmap of a switched-out video stream is found based on a stream number 2. When a value of the second bit of the bitmap of the switched-out video stream is 0, the second bit of the bitmap of the switched-out video stream is set as 1. In this case, the bitmap of the switched-out video stream is 0011. For example, a stream state in a switching sub-table of the video stream 2 is the switched-in stream. A first bit of a bitmap of a switched-in stream is found based on a stream number 1. When a value of the first bit of the bitmap of the switched-in stream is 0, the first bit of the bitmap of the switched-in stream is set as 1. In this case, the bitmap of the switched-in stream is 0001. A stream state of the audio stream 2 is the switched-in stream. A second bit of a bitmap of a switched-in stream is found based on a stream number 2. When a value of the second bit of the bitmap of the switched-in stream is 0, the second bit of the bitmap of the switched-in stream is set as 1. In this case, the bitmap of the switched-in stream is 0011.

(3) Further update, when the stream type is a video stream, a timestamp of the latest packet in the switched-in stream and a timestamp of the latest packet in the switched-out video stream that are in the switching summary tables. An update rule is as follows. Compare timestamp of packet in a switching sub-table with the timestamp of the latest packet corresponding to the switching summary table, and update the timestamp of the latest packet in the switching summary table only when the timestamp of the packet in the switching sub-table is greater than the timestamp of the packet in the switching summary table. For example, there are two switched-in video streams, a video stream A and a video stream B. In the video stream A, a timestamp of a packet in a switched-in stream in a switching summary table is updated based on a timestamp of a packet in a switching sub-table. In the video stream B, a timestamp of a packet in a switched-in stream in a switching summary table is updated based on a timestamp of a packet in a switching sub-table. When the timestamp of the packet in the switching sub-table of the video stream A is greater than the timestamp of the packet in the switching sub-table of video stream B, the timestamp of the packet in the switched-in stream in the switching summary table is the timestamp of the packet in the switching sub-table of the video stream A.

(4) Calculate switching points of the media streams, and calculate a quantity of bits whose value is 1 in both the bitmap of the switched-out video stream and the bitmap of the switched-in video stream. When the quantity of bits whose value is 1 in both the bitmap of the switched-out video stream and the bitmap of the switched-in video stream is equal to a total quantity of streams in the switching in this time, it indicates that switching tables of all to-be-switched media streams are updated, and the switching points can be calculated. For example, the total quantity pairs of streams in the switching at this time is 2, and switching summary tables of both the video stream 1 and the audio stream 1 are updated, and values of the bitmaps of the switched-out video stream are 0011. A bit whose value is 1 is equal to 2, it indicates that the switched-out video streams are ready for calculating the switching points. After switching summary tables that are the video stream 2 and the audio stream 2 are updated, values of the bitmaps of the switched-in stream are 0011. A bit whose value is 1 is equal to 2, it indicates that the switched-in video streams are ready for calculating the switching points.

S805. When the stream type is the video streams, calculate timestamps of switching points of the video streams based on the timestamp of the latest packet in the switched-out video stream and the timestamp of the latest packet in the switched-in stream that are in the switching summary table.

A specific calculation manner is described above, and details are not described herein again. After timestamps of switching points are calculated for the switched-in streams, the timestamps of the switching points are updated to timestamps $TS\_sw\_v1$ that are of switching points of switched-in streams and that are in the switching summary tables. After timestamps of switching points are calculated for the switched-out video streams, the timestamps of the switching points of the switched-out video streams are updated to timestamps $TS\_sw\_v1$ that are of switching points of switched-out video streams and that are in the switching summary tables. Then, a switching point calculation completion flag in the switching summary table is set to 1.

S806. When the stream type is the audio streams, determine timestamps of switching points of the audio streams based on a timestamp that is of a switching point of the video stream and that is in the switching summary table.

Specifically, timestamps of switching points of the switched-in streams in the audio streams are calculated based on a timestamp $TS\_sw\_v2$ that is of a switching point of a switched-in stream in the video stream and that is in the switching summary table. Timestamps of switching points of the switched-out stream in the audio stream are calculated based on a timestamp $TS\_sw\_v1$ that is of a switching point of a switched-out stream in the video stream and that is in the switching summary table.

Further, a sequence number $SN\_sw\_a1$ of a switching point of the audio stream 1 may be determined based on a timestamp of the switching point of the audio stream 1. A sequence number $SN\_sw\_a1$ of a switching point of the audio stream 2 is determined based on a timestamp of the switching point of the audio stream 2.

It should be noted that, the timestamp of the switching point of the audio stream may be calculated only when the switching point calculation completion flag in the switching summary table 1.

After calculating the switching points of the media streams, whether to forward or discard each packet of the media stream is determined in packets according to a stream packet forwarding and discarding rule.

S807a. Discard packets that are in the video stream 1 and whose timestamps are greater than a timestamp of a switching point of the video stream 1, and forward packets that are in the video stream 2 and whose timestamps are greater than a timestamp of a switching point of the video stream 2.

S807b. Discard packets that are in the audio stream 1 and whose timestamps are greater than the timestamp of the switching point of the audio stream 1, and forward packets that are in the audio stream 2 and whose timestamps are greater than the timestamp of the switching point of the audio stream 2.

In addition, when the packets in the audio stream 2 (the switched-in stream) are forwarded, information such as a multicast address and a sequence number is modified. After the media streams are switched, multicast addresses, sequence numbers, RTP.SSRCs, and HBRMT layers defined by the SMPTE of packets need to be modified before the packets are sent to a downstream device, so that modified packets and currently output packets can be the same. In this way, the downstream device is unaware of the switching.

The RTP.SSRC indicates a synchronization source identifier. Generally, the RTP.SSRC occupies 32 bits and is used to identify a synchronization source. The identifier is randomly selected. Two synchronization sources participating in a same video conference cannot have a same SSRC. The synchronization source herein indicates a source, for example, a microphone, a camera, or an RTP mixer that generates a media stream. A receiver distinguishes different sources based on the SSRC identifier and groups RTP packets.

If the downstream device can tolerate changes of the multicast address, an RTP.SN, the RTP.SSRC, and HBRMT.FRCount (FRCount is a frame count field in a high bit rate media payload header defined by the SMPTE, indicates a quantity of accumulated video frames in the stream, is 8 bits in total, and if the quantity of accumulated video frames in the stream exceeds 256 frames, the FRCount is reset to be 0.), corresponding modification step may be skipped.

A plurality of input video streams (or audio streams) may need to be switched repeatedly on one video stream output port (or an audio stream output port). Therefore, a current switched-out video stream may be a previous switched-in stream. The system can keep multicast addresses, RTP.SNs, RTP.SSRCs, and the like that are of the switched-in stream and the switched-out video stream the same. The multicast address and the RTP.SSRC remain unchanged and the RTP.SN remains continuous.

The following briefly describes a manner of modifying a multicast address and a sequence number.

Figure 8A:
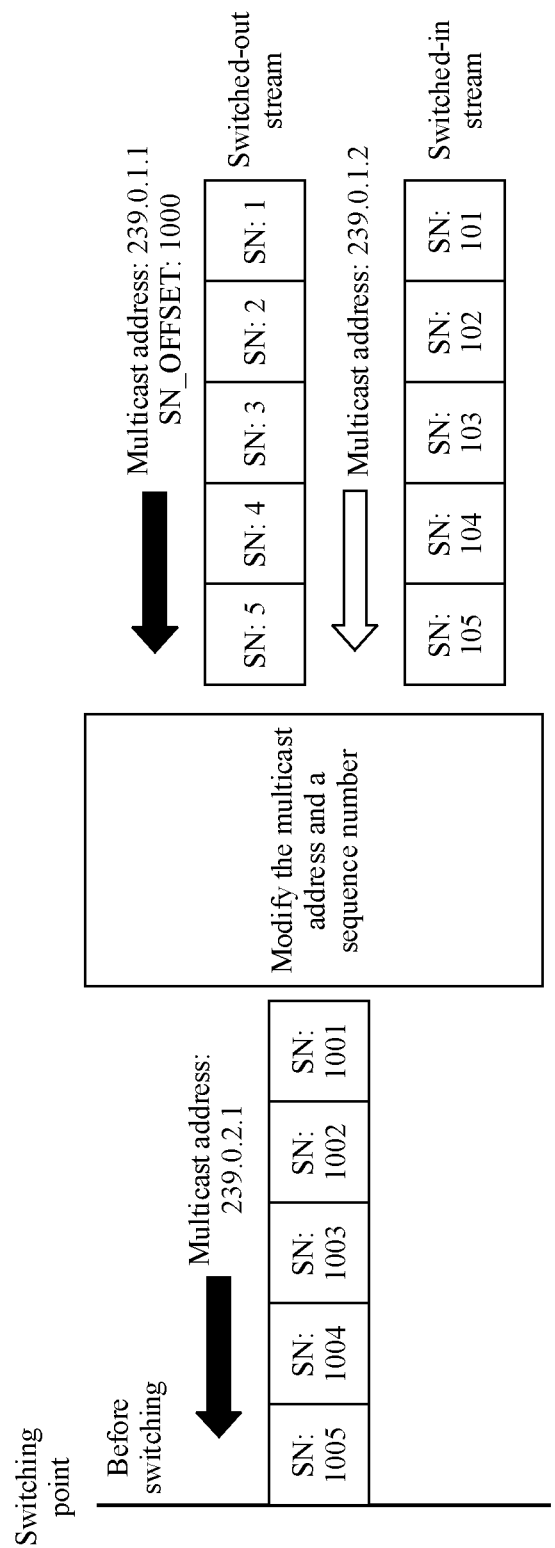
FIG. 8A is a schematic diagram of a manner of modifying a multicast address and a sequence number before switching according to an embodiment of this application.

Before switching, packets in a switched-out video stream (an audio stream 1 or a video stream 1) are forwarded after arriving at a switching device, and a multicast address and an SN number that are of the switched-out video stream are modified. The multicast address is modified from 239.0.1.1 to 239.0.2.1. An RTP.SSRC is modified to 0x12345678. The RTP.SN number is RTP.SN (an output stream)=RTP.SN (the switched-out video stream)+C1, where C1 is a constant and is obtained by using an SN difference between packets that are in the output stream and the switched-out video stream and whose timestamps are the same. As shown in FIG. 8A, C1 is equal to 1000. In this case, if the switched-out video stream is a stream output before the switching, a multicast address, an RTP.SSRC, and an RTP.SN of a current output stream can be the same as those of the switched-out stream. In this case, the multicast address, the RTP.SSRC, and the RTP.SN are not modified. Packets in a switched-in stream are discarded after arriving at the switching device.

Figure 8B:
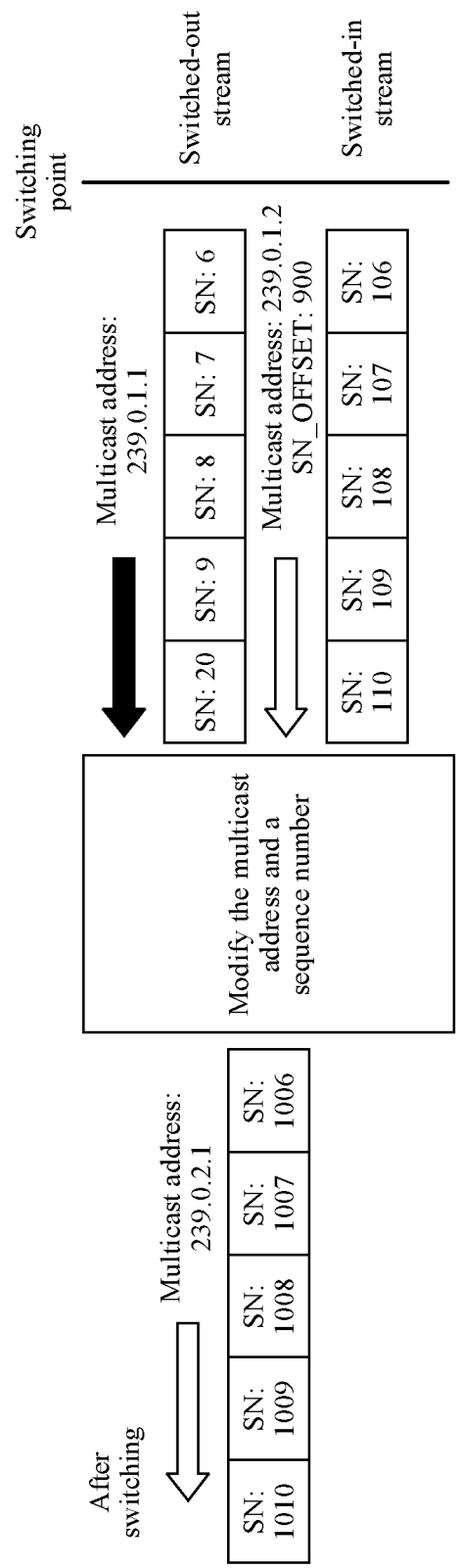
FIG. 8B is a schematic diagram of a manner of modifying a multicast address and a sequence number after switching according to an embodiment of this application.

After the switching, packets in a switched-out video stream are discarded after arriving at the switching device. Packets in a switched-in stream are forwarded after arriving at the switching device, and a multicast address and an SN number are modified. The multicast address is modified from 239.0.1.2 to 239.0.2.1. An RTP.SSRC is modified to 0x12345678. The RTP.SN number is RTP.SN (an output stream)=RTP.SN. (the switched-in stream)+C2, where C2 is a constant and is obtained by using an SN difference between packets that are in the output stream and the switched-in stream and whose timestamps are the same. As shown in FIG. 8B, C2 is equal to 900.

Optionally, after the switching is started and a specific quantity of packets or a preset duration are processed, the audio stream 1 and the audio stream 2, and the video stream 1 and the video stream 2 enter a stable state, and the switching is completed. Stream types in switching sub-tables corresponding to the audio stream 1 and the video stream 1 are updated as normally forwarded streams and stream types in switching sub-tables corresponding to the video stream 2 and the audio stream 2 are updated as normally discarded stream. In this way, a timestamp and a sequence number are not checked packet by packet to determine whether to forward or discard the packet. Instead, whether to forward or discard the packet is determined based on the stream type. An entire switching process is complete. In addition, another field in the switching sub-table except the stream type and a sequence number offset may be reset.

In the foregoing description of this embodiment of this application, when the audio streams and the video streams are synchronously switched, the audio streams are switched with the video streams. In other words, audio parameter values of switching points of the audio streams are determined based on video parameter values of switching points of the video streams. In an example, in this embodiment of this application, a flag, for example, a switching following flag, may be added to the audio stream. When the switching following flag is 1, it indicates that the audio streams need to be switched with the video streams. In this case, when the switching points are calculated, timestamps of the switching points of the audio streams are calculated based on timestamps of the switching points of the video streams recorded in the switching summary table, as described above.

When the switching following flag is 0, it indicates that the audio streams do not need to be switched with the video streams. In other words, when audio parameter values of switching points of the audio streams are determined separately for the audio streams, timestamps of the switching points of the audio streams do not need to be calculated based on timestamps of the switching points of the video streams.

The following describes an implementation of separately determining the audio parameter values of the switching points of the audio streams.

The switching device receives the switching instruction, and determines the timestamps of the switching points based on a timestamp of a packet 1 in the audio stream 1 and a timestamp of a packet 2 in the audio stream 2. The switching device switches packets that are in the audio stream 1 and whose audio parameter values are greater than the audio parameter value of the switching point to packets that are in the audio stream 2 and whose audio parameter values are greater than the audio parameter value of the switching point. In other words, the audio stream 1 and the audio stream 2 share one timestamp of the switching points. The packet 1 is a packet that is in the audio stream 1 and that is received after the switching instruction is received. The packet 2 is a packet that is in the audio stream 2 and that is received after the switching instruction is received. The packet 1 and the packet 2 are received at the same time.

That the timestamps of the switching points are determined based on the timestamp of the packet 1 in the audio stream 1 and the timestamp of the packet 2 in the audio stream 2 is implemented in the following manner.

A maximum timestamp in both the timestamp of the packet 1 and the timestamp of the packet 2 is obtained, and the timestamps of the switching points are determined based on the maximum timestamp.

The timestamps of the switching points meet the following conditions, TS_sw_in=TS_sw_out=TS+N*frequency, where TS=max (TS_out, TS_in), TS_out is the timestamp of the packet 1, TS_in is the timestamp of the packet 2, TS is a maximum value in TS_out and TS_in, N is a fixed value whose value range is (5 to 100), and frequency is a sampling rate of the audio stream.

In a possible implementation, if sampling rates of the audio streams are preconfigured for the switching device or are determined before the switching instruction is received, the packet 1 may be a packet that is in the audio stream 1 and that is received when the switching instruction is received, and the packet 2 may be a packet that is in the audio stream 2 and that is received when the switching instruction is received. If the sampling rates of the audio streams are started to be calculated when the switching instruction is received, the packet 1 may be a packet that is in the audio stream 1 and that is received when the sampling rates are determined, and the packet 2 may be a packet that is in the audio stream 2 and that is received when the sampling rates are determined.

For example, when determining the timestamps of the switching points, the switching device may determine the timestamps of the switching points based on timestamps of packets, recorded in switching sub-tables corresponding to each of the audio stream 1 and the audio stream 2. In other words, when the switching instruction is received, a timestamp of a packet, recorded in a switching sub-table of the audio stream 1 is the timestamp of the packet 1, and a timestamp of a packet, recorded in a switching sub-table of the audio stream 2 is the timestamp of the packet 2.

Figure 9:
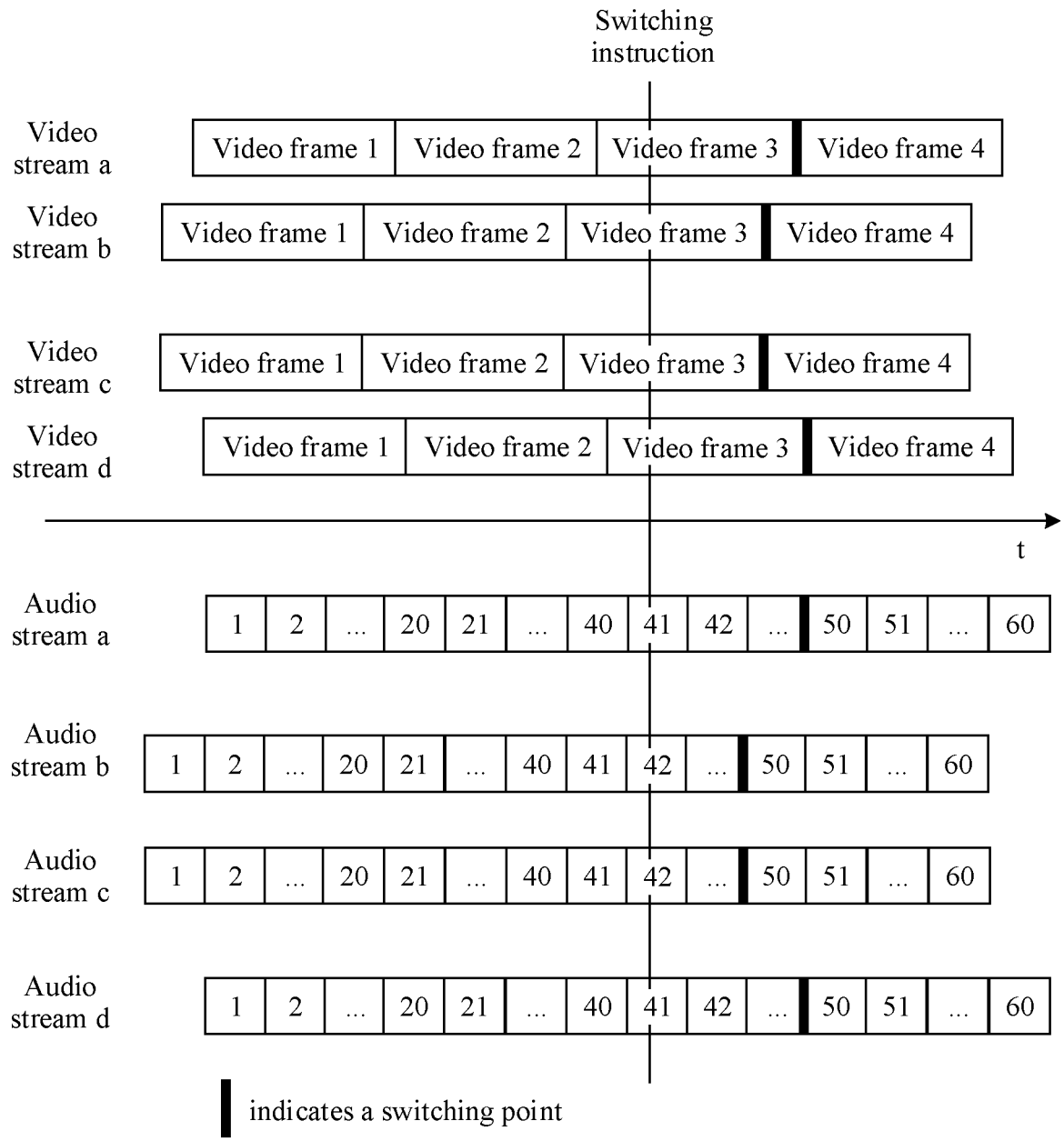
FIG. 9 is a schematic diagram of simultaneously switching a plurality of video streams and a plurality of audio streams according to an embodiment of this application.

In addition, this embodiment of this application is also applicable to a case in which a plurality of pairs of audio streams and a plurality of pairs of video streams are synchronously switched. For example, Y audio streams are switched to other Y audio streams, X video streams are switched to other X video streams, where Y is a positive integer greater than or equal to 2, X is a positive integer greater than or equal to 2, and X may be equal to or not equal to Y. For example, referring to FIG. 9, an example in which two audio streams are switched to other two audio streams and two video streams are switched to other two video streams is used. A difference between switching between a plurality of media streams and switching between media audio streams lies in that, a video stream with an earlier timestamp in two video streams included in the switched-in video stream and a video stream with an earlier timestamp in two video streams included in a switched-out video stream need to be first determined before a timestamp of a switching point of a video stream and/or a sequence number of a switching point of a video stream are/is calculated in a switching process. A synchronization relationship is determined based on the video stream with the earlier timestamp in the switched-in video stream and the video stream with the earlier timestamp in the switched-out video stream. A timestamp of a switching point of the switched-in video stream is determined based on the synchronization relationship and the video stream with the earlier timestamp in the switched-in video stream. A timestamp of a switching point of the switched-out video stream is determined based on the synchronization relationship and the video stream with the earlier timestamp in the switched-out video stream. Then, a timestamp of a switching point of a switched-in audio stream is determined based on the timestamp of the switching point of the switched-in video stream, and a timestamp of the switching point of a switched-out audio stream is determined based on the timestamp of the switching point of the switched-out stream. For example, referring to FIG. 9, the switched-in video streams include a video stream a and a video stream b. The switched-out video stream includes a video stream c and a video stream d. The switched-in stream includes an audio stream a and an audio stream b. The switched-out audio stream includes an audio stream c and an audio stream d. It can be seen from FIG. 9 that, in the switched-in video stream, the video stream b is ahead of the video stream a, and in the switched-out video stream, the video stream c is ahead of the video stream d. Timestamps of switching points of both the switched-in video stream and the switched-out video stream, and/or sequence numbers of switching points of both the switched-in video stream and the switched-out video stream are respectively determined based on timestamps of both the video stream b and the video stream c. A specific determining manner is described above, and details are not described herein again.

Figure 10:
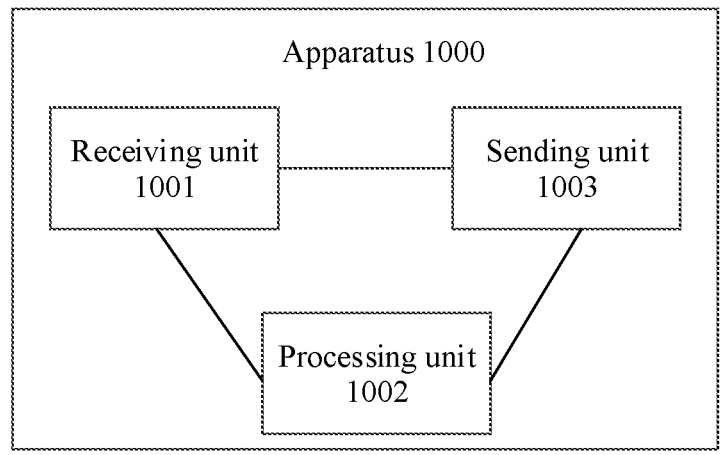
FIG. 10 is a schematic diagram of a structure of an apparatus 1000 according to an embodiment of this application.

As shown in FIG. 10, an embodiment of this application further provides an apparatus. The apparatus may include a receiving unit 1001, a processing unit 1002, and a sending unit 1003.

In a possible implementation, the apparatus implements a function of the switching device in the foregoing method. The apparatus may be a switching device, one or more processors in a switching device, or one or more chips in a switching device. Specifically, the receiving unit 1001, the processing unit 1002, and the sending unit 1003 may perform corresponding functions performed by the switching device in any one of the foregoing method embodiments. Details are not described herein again.

In this embodiment of this application, division into the units is an example, and is merely logical function division, and may be other division in actual implementation. In addition, function units in this embodiment of this application may be integrated into one processor, may exist alone physically, or two or more units may be integrated into one unit. The integrated unit may be implemented in a form of hardware, or may be implemented in a form of a software functional unit.

Figure 11:
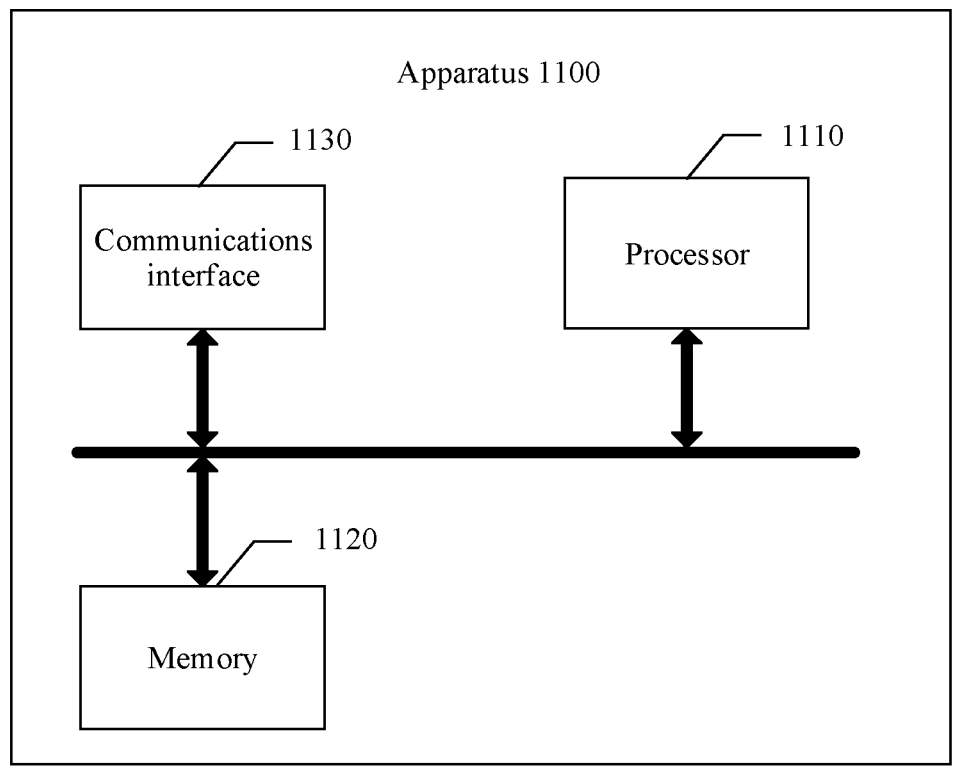
FIG. 11 is a schematic diagram of a structure of an apparatus 1100 according to an embodiment of this application.

Based on a same concept, FIG. 11 shows an apparatus 1100 provided in this application. The apparatus 1100 includes at least one processor 1110, for example, the processor executed in the foregoing embodiment. The apparatus may further include at least one memory 1120 configured to store a program instruction and/or data. The memory 1120 is coupled to the processor 1110. The coupling in this embodiment of this application is an indirect coupling or a communication connection between apparatuses, units, or modules, may be in an electrical form, a mechanical form, or another form, and is used for information exchange between the apparatuses, the units, or the modules. The processor 1110 may operate with the memory 1120. The processor 1110 may execute the program instruction stored in the memory 1120, so that the processor 1110 invokes the program instruction to implement a function of the processor 1110. Optionally, at least one of the at least one memory 1120 may be included in the processor 1110. The apparatus 1100 may further include a communications interface 1130, and the apparatus 1100 may exchange information with another device via the communications interface 1130. The communications interface 1130 may be a circuit, a bus, a transceiver, or any other apparatus that may be configured to exchange information.

The apparatus 1100 is used in a switching device. Specifically, the apparatus 1100 may be a switching device, or may be an apparatus that can support a switching device in implementing a function of the switching device in the method in any one of the foregoing embodiments. For example, the at least one processor 1110 in the apparatus 1100 is configured to implement a function of the switching device in the method in any one of the foregoing embodiments.

For example, the apparatus 1100 may be a chip or a chip system. Optionally, in this embodiment of this application, the chip system may include a chip, or may include a chip and another discrete component.

In this embodiment of this application, a specific connection medium between the communications interface 1130, the processor 1110, and the memory 1120 is not limited. In this embodiment of this application, in FIG. 11, the memory 1120, the processor 1110, and the communications interface 1130 are connected through a bus. The bus is represented by a thick line in FIG. 11. A connection manner between other components is for illustration purposes, and is not limited thereto. The bus may be classified into an address bus, a data bus, a control bus, and the like. For ease of representation, only one thick line is used to represent the bus in FIG. 11, but this does not mean that there is only one bus or only one type of bus.

In the embodiments of this application, the processor may be a general processor, a digital signal processor, an application-specific integrated circuit, a field programmable gate array or another programmable logic device, a discrete gate or transistor logic device, or a discrete hardware component, and may implement or execute the methods, steps, and logical block diagrams disclosed in the embodiments of this application. The general purpose processor may be a microprocessor, any conventional processor, or the like. The steps of the method disclosed with reference to the embodiments of this application may be directly performed by a hardware processor, or may be performed by using a combination of hardware in the processor and a software module.

In the embodiments of this application, the memory may be a nonvolatile memory, such as a hard disk drive (HDD) or a solid-state drive (SSD), or may be a volatile memory, such as a random access memory (RAM). The memory may further be any other medium that can be configured to carry or store expected program code in a form of an instruction or a data structure and that can be accessed by a computer, but is not limited thereto. The memory in the embodiments of this application may alternatively be a circuit or any other apparatus that can implement a storage function, and is configured to store a program instruction and/or data.

Based on the foregoing embodiments, an embodiment of this application further provides a computer storage medium. The storage medium stores a software program. When the software program is read and executed by one or more processors, the method provided in any one or more of the foregoing embodiments may be implemented. The computer storage medium may include any medium that can store program code, such as a USB flash drive, a removable hard disk, a read-only memory, a random access memory, a magnetic disk, or an optical disc.

Based on the foregoing embodiments, an embodiment of this application further provides a chip. The chip includes a processor configured to implement a function in any one or more of the foregoing embodiments, for example, obtain or process the information or the message in the foregoing methods. Optionally, the chip further includes a memory, and the memory is configured to store a program instruction and data that are necessary and executed by the processor. The chip may include a chip, or may include a chip and another discrete device.

A person skilled in the art should understand that the embodiments of this application may be provided as a method, a system, or a computer program product. Therefore, this application may use a form of hardware only embodiments, software only embodiments, or embodiments with a combination of software and hardware. Moreover, this application may use a form of a computer program product that is implemented on one or more computer-usable storage media (including but not limited to a disk memory, a CD-ROM, an optical memory, and the like) that include computer-usable program code.

This application is described with reference to the flowcharts and/or block diagrams of the method, the device (system), and the computer program product according to the embodiments of this application. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may be stored in a computer-readable memory that can instruct the computer or any other programmable data processing device to work in a specific manner, so that the instructions stored in the computer-readable memory generate an artifact that includes an instruction apparatus. The instruction apparatus implements a specific function in one or more processes in the flowcharts and/or in one or more blocks in the block diagrams.

These computer program instructions may be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

Obviously, a person skilled in the art can make various modifications and variations to this application without departing from the scope of this application. This application is intended to cover these modifications and variations of this application provided that they fall within the scope of protection defined by the following claims and their equivalent technologies.

What is claimed is:

1. An audio stream and video stream synchronous switching method implemented by a switching device, wherein the method comprises:
   receiving a switching instruction instructing to switch from a first audio stream to a second audio stream and switch from a first video stream to a second video stream;
   determining a video parameter value of a switching point of the first video stream, wherein the video parameter value of the switching point of the first video stream comprises one or more of a first timestamp or a first sequence number;

determining a video parameter value of a switching point of the second video stream, wherein the video parameter value of the switching point of the second video stream comprises one or more of a second timestamp or a second sequence number;

determining an audio parameter value of a switching point of the first audio stream based on the first timestamp, wherein the audio parameter value of the switching point of the first audio stream comprises one or more of a third timestamp or a third sequence number;

determining an audio parameter value of a switching point of the second audio stream based on the second timestamp, wherein the audio parameter value of the switching point of the second audio stream comprises one or more of a fourth timestamp or a fourth sequence number;

switching packets, in the first video stream, comprising video parameter values greater than the video parameter value of the switching point of the first video stream to packets, in the second video stream comprising video parameter values greater than the second video parameter value; and switching packets in the first audio stream comprising audio parameter values greater than the audio parameter value of the switching point of the first audio stream to packets in the second audio stream comprising audio parameter values greater than the audio parameter value of the switching point of the second audio stream.

2. The method of claim 1, wherein determining the video parameter value of the switching point of the first video stream and determining the video parameter value of the switching point of the second video stream comprises:

determining a synchronization relationship between the first video stream and the second video stream based on a timestamp of a first packet in the first video stream and a timestamp of a second packet in the second video stream, wherein a time period of receiving a first video frame to which the first packet belongs overlaps a time period of receiving a second video frame to which the second packet belongs;

determining the video parameter value of the switching point of the first video stream based on the synchronization relationship and a video parameter value of the first packet; and determining the video parameter value of the switching point of the second video stream based on the synchronization relationship and a video parameter value of the second packet.

3. The method of claim 2, wherein determining the video parameter value of the switching point of the first video stream and determining the video parameter value of the switching point of the second video stream comprises:

determining the first timestamp based on the synchronization relationship, the timestamp of the first packet, and a video frame duration of the first video stream; and determining the second timestamp based on the synchronization relationship, the timestamp of the second packet, and a video frame duration of the second video stream.

4. The method of claim 3, wherein the video frame duration of the first video stream is determined based on a timestamp difference between received frame trailer packets in two adjacent video frames in the first video stream, and the video frame duration of the second video stream is determined based on a timestamp difference between received frame trailer packets in two adjacent video frames in the second video stream, or wherein the video frame duration of the first video stream is determined based on a timestamp difference between received frame header packets in two adjacent video frames in the first video stream, and the video frame duration of the second video stream is determined based on a timestamp difference between received frame header packets in two adjacent video frames in the second video stream.

5. The method of claim 2, wherein determining the video parameter value of the switching point of the first video stream and determining the video parameter value of the switching point of the second video stream comprises:

determining the first sequence number based on the synchronization relationship, a sequence number of the first packet, and a quantity of packets in a video frame in the first video stream; and determining the second sequence number based on the synchronization relationship, a sequence number of the second packet, and a quantity of packets in a video frame in the second video stream.

6. The method of claim 5, wherein the quantity of packets in the video frame in the first video stream is determined based on a sequence number difference between received frame trailer packets in two adjacent video frames in the first video stream, and the quantity of packets in the video frame in the second video stream is determined based on a sequence number difference between received frame trailer packets in two adjacent video frames in the second video stream, or wherein the quantity of packets in the video frame in the first video stream is determined based on a sequence number difference between received frame header packets in two adjacent video frames in the first video stream, and the quantity of packets in the video frame in the second video stream is determined based on a sequence number difference between received frame header packets in two adjacent video frames in the second video stream.

7. The method of claim 6, wherein the two adjacent video frames in the first video stream are received before the switching instruction is received and the two adjacent video frames in the second video stream are received before the switching instruction is received, wherein the first video frame is a previous video frame of a video frame in which a packet in the first video stream is received when the switching instruction is received and the second video frame is a previous video frame of a video frame in which a packet in the second video stream is received when the switching instruction is received, or the first video frame is a next video frame of a video frame in which a packet in the first video stream is received when the switching instruction is received and the second video frame is a next video frame of a video frame in which a packet in the second video stream is received when the switching instruction is received.

8. The method of claim 6, wherein the two adjacent video frames in the first video stream comprise a first received video frame in which a packet in the first video stream is received when the switching instruction is received and a next video frame of the first received video frame, wherein the two adjacent video frames in the second video stream comprise a second received video frame in which a packet in the second video stream is received when the switching instruction is received and a next video frame of the second received video frame, wherein the first video frame is a next video frame of a video frame in which a packet in the first video stream is received when the switching instruction is received, and wherein the second video frame is a next video frame of a video frame in which a packet in the second video stream is received when the switching instruction is received.

9. The method of claim 2, wherein the first packet is a frame trailer packet in the first video frame and the second packet is a frame trailer packet in the second video frame, or wherein the first packet is a frame header packet in the first video frame, and the second packet is a frame header packet in the second video frame.

10. The method of claim 1, wherein determining the audio parameter value of the switching point of the first audio stream and determining the audio parameter value of the switching point of the second audio stream comprises:
determining the third timestamp based on the first timestamp, a video frame duration of the first video stream, a clock frequency of the first video stream, and a sampling rate of the first audio stream; and
determining the fourth timestamp based on the second timestamp, a video frame duration of the second video stream, a clock frequency of the second video stream, and a sampling rate of the second audio stream.

11. The method of claim 1, wherein determining the audio parameter value of the switching point of the first audio stream and determining the audio parameter value of the switching point of the second audio stream comprises:
determining the third timestamp based on the first timestamp;
determining the third sequence number based on the third timestamp;
determining the fourth timestamp based on the second timestamp; and
determining the fourth sequence number based on the fourth timestamp.

12. A switching apparatus, comprising:
a memory comprising instructions; and
a processor coupled to the memory and configured to execute the instructions to cause the switching apparatus to:
receive a switching instruction instructing to switch from a first audio stream to a second audio stream and switch from a first video stream to a second video stream;
determine a video parameter value of a switching point of the first video stream, wherein the video parameter value of the switching point of the first video stream comprises one or more of a first timestamp or a first sequence number;
determine a video parameter value of a switching point of the second video stream, wherein the video parameter value of the switching point of the second video stream comprises one or more of a second timestamp or a second sequence number;
determine an audio parameter value of a switching point of the first audio stream based on the first timestamp, wherein the audio parameter value of the switching point of the first audio stream comprises one or more of a third timestamp or a third sequence number;
determine an audio parameter value of a switching point of the second audio stream based on the second timestamp, wherein the audio parameter value of the switching point of the second audio stream comprises one or more of a fourth timestamp or a fourth sequence number;
switch packets in the first video stream comprising video parameter values greater than the video parameter value of the switching point of the first video stream to packets in the second video stream comprising video parameter values greater than the video parameter value of the switching point of the second video stream; and
switch packets in the first audio stream comprising audio parameter values greater than the audio parameter value of the switching point of the first audio stream to packets in the second audio stream comprising audio parameter values greater than the audio parameter value of the switching point of the second audio stream.

13. The switching apparatus of claim 12, wherein the instructions further cause the switching apparatus to:
determine a synchronization relationship between the first video stream and the second video stream based on a timestamp of a first packet in the first video stream and a timestamp of a second packet in the second video stream, wherein a time period of receiving a first video frame to which the first packet belongs overlaps a time period of receiving a second video frame to which the second packet belongs; and
determine the video parameter value of the switching point of the first video stream based on the synchronization relationship and a video parameter value of the first packet; and
determine the video parameter value of the switching point of the second video stream based on the synchronization relationship and a video parameter value of the second packet.

14. The apparatus of claim 13, wherein the instructions further cause the switching apparatus to:
determine the first timestamp based on the synchronization relationship, the timestamp of the first packet, and a video frame duration of the first video stream; and
determine the second timestamp based on the synchronization relationship, the timestamp of the second packet, and a video frame duration of the second video stream.

15. The apparatus of claim 14, wherein the video frame duration of the first video stream is determined based on a timestamp difference between received frame trailer packets in two adjacent video frames in the first video stream, and the video frame duration of the second video stream is determined based on a timestamp difference between received frame trailer packets in two adjacent video frames in the second video stream, or wherein the video frame duration of the first video stream is determined based on a timestamp difference between received frame header packets in two adjacent video frames in the first video stream, and the video frame duration of the second video stream is determined based on a timestamp difference between received frame header packets in two adjacent video frames in the second video stream.

16. The apparatus of claim 13, wherein the instructions further cause the switching apparatus to:
determine the first sequence number based on the synchronization relationship, a sequence number of the first packet, and a quantity of packets in a video frame in the first video stream; and
determine the second sequence number based on the synchronization relationship, a sequence number of the second packet, and a quantity of packets in a video frame in the second video stream.

17. The apparatus of claim 16, wherein the instructions further cause the switching apparatus to:
determine the third timestamp based on the first timestamp;

determine the third sequence number based on the third timestamp;

determine the fourth timestamp based on the second timestamp; and determine the fourth sequence number based on the fourth timestamp.

18. The apparatus of claim 16, wherein the quantity of packets in the video frame in the first video stream is determined based on a sequence number difference between received frame trailer packets in two adjacent video frames in the first video stream, and the quantity of packets in the video frame in the second video stream is determined based on a sequence number difference between received frame trailer packets in two adjacent video frames in the second video stream, or wherein the quantity of packets in the video frame in the first video stream is determined based on a sequence number difference between received frame header packets in two adjacent video frames in the first video stream, and the quantity of packets in the video frame in the second video stream is determined based on a sequence number difference between received frame header packets in two adjacent video frames in the second video stream.

19. The apparatus of claim 18, wherein the two adjacent video frames in the first video stream are received before the switching instruction is received, and the two adjacent video frames in the second video stream are received before the switching instruction is received, wherein the first video frame is a previous video frame of a video frame in which a packet in the first video stream is received when the switching instruction is received, and the second video frame is a previous video frame of a video frame in which a packet in the second video stream is received when the switching instruction is received, or wherein the first video frame is a next video frame of a video frame in which a packet in the first video stream is received when the switching instruction is received, and the second video frame is a next video frame of a video frame in which a packet in the second video stream is received when the switching instruction is received.

20. The apparatus according to claim 18, wherein the two adjacent video frames in the first video stream comprise a first received video frame in which a packet in the first video stream is received when the switching instruction is received and a next video frame of the first received video frame, and the two adjacent video frames in the second video stream comprise a second received video frame in which a packet in the second video stream is received when the switching instruction is received and a next video of the second received video frame, wherein the first video frame is a next video frame in which a packet in the first video stream is received when the switching instruction is received, and the second video frame is a next video frame in which a packet in the second video stream is received when the switching instruction is received.

21. The apparatus of claim 13, wherein the first packet is a frame trailer packet in the first video frame, and the second packet is a frame trailer packet in the second video frame, or wherein the first packet is a frame header packet in the first video frame, and the second packet is a frame header packet in the second video frame.

22. The apparatus of claim 12, wherein the instructions further cause the switching apparatus to:

determine the third timestamp based on the first timestamp, the video frame duration of the first video stream, a clock frequency of the first video stream, and a sampling rate of the first audio stream, and determine the fourth timestamp based on the second timestamp, the video frame duration of the second video stream, a clock frequency of the second video stream, and a sampling rate of the second audio stream.

* * * * *